(12) United States Patent
Tylik et al.

(10) Patent No.: US 12,086,159 B1
(45) Date of Patent: Sep. 10, 2024

(54) TECHNIQUES FOR ADDING AND REMOVING STORAGE OBJECTS FROM GROUPS

(71) Applicant: Dell Products L.P., Hopkinton, MA (US)

(72) Inventors: Dmitry Nikolayevich Tylik, Westborough, MA (US); Vasudevan Subramanian, Chapel Hill, NC (US); Girish Sheelvant, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/142,224

(22) Filed: May 2, 2023

(51) Int. Cl.
  *G06F 16/30* (2019.01)
  *G06F 3/06* (2006.01)
  *G06F 16/27* (2019.01)

(52) U.S. Cl.
  CPC ............ *G06F 16/275* (2019.01); *G06F 3/065* (2013.01)

(58) Field of Classification Search
  None
  See application file for complete search history.

(56) References Cited

U.S. PATENT DOCUMENTS

| | | | | |
|---|---|---|---|---|
| 8,838,539 | B1 * | 9/2014 | Ashcraft | H04L 67/01 707/637 |
| 11,513,684 | B1 * | 11/2022 | Tylik | G06F 3/0644 |
| 2004/0133591 | A1 * | 7/2004 | Holenstein | G06F 11/2064 707/999.102 |
| 2010/0205392 | A1 * | 8/2010 | Schnapp | G06F 3/067 711/E12.001 |
| 2013/0086349 | A1 * | 4/2013 | Kaiya | G06F 3/0619 711/164 |
| 2018/0067698 | A1 * | 3/2018 | Prasad | G06F 11/203 |
| 2019/0303017 | A1 * | 10/2019 | LeCrone | G06F 3/0619 |
| 2020/0026429 | A1 * | 1/2020 | Chen | G06F 3/065 |
| 2020/0097180 | A1 * | 3/2020 | Hironaka | G06F 3/0619 |
| 2020/0218712 | A1 * | 7/2020 | Urry | G06F 16/2365 |

(Continued)

OTHER PUBLICATIONS

Dell EMC SRDF Introduction, Sep. 2019 (Year: 2019) (Year: 2019).*

(Continued)

*Primary Examiner* — Polina G Peach
(74) *Attorney, Agent, or Firm* — Muirhead and Saturnelli, LLC

(57) ABSTRACT

Techniques can include: establishing synchronous replication configurations between first and second sites for a group of stretched resources and a stretched resource; and performing processing that adds the stretched resource to the group. While both the group and stretched resource are in an active-active state and replicating data, existing replication session objects associated with stretched resource on both sites can be deleted while retaining remaining portions of layered services stacks corresponding to the stretched resource on both sites. A first remaining portion can be added to a first replication session object corresponding to the group on the first site. A second remaining portion can be added to a second replication session object corresponding to the group on the second site. Even though the existing replication session objects associated with the stretched resource may be deleted, the existing configuration corresponding to the stretched object can be retained.

20 Claims, 19 Drawing Sheets

(56) References Cited

U.S. PATENT DOCUMENTS

| | | | |
|---|---|---|---|
| 2020/0301886 A1* | 9/2020 | Narasingarayanapeta | ................... G06F 21/6218 |
| 2022/0043577 A1* | 2/2022 | Doucette | ................. G06F 3/067 |
| 2023/0009529 A1* | 1/2023 | Meiri | ..................... G06F 12/10 |

OTHER PUBLICATIONS

PureStorage, "Pure Storage Purity Activecluster," Solution Overview, Mar. 15, 2021.

U.S. Appl. No. 18/133,556, filed Apr. 12, 2023, entitled Techniques for Implementing Group Modifications, to Girish Sheelvant, et al.

* cited by examiner

300 ↘

302 — The metro replication configuration with respect to the group GP1 of stretched resources and the stretched resource or object S11 being added transitions into bias mode. The sites A and B of the metro replication configuration may already be in bias mode or may transition from a witness mode to bias mode. When in the witness mode, a third system or site C can serve as a witness which is in communication with the sites A and B, where the witness can facilitate selection of a single one of the sites A and B which continues servicing I/Os directed to the group members and stretched resource being added responsive to a replication failure or fracture with respect to the group.

Transitioning from witness mode to bias mode can include disengaging the witness from its witness role in connection with selecting the foregoing single site responsive to a replication failure or fracture with respect to the group or stretched resource being added.

When in bias mode, only the preferred site can win or be selected as the single site which continues servicing I/Os directed to the group members of GP1 and stretched resource S11 being added, responsive to a replication failure or fracture with respect to GP1 and S11. Responsive to the foregoing replication failure or fracture, both the group GP1 and the stretched resource S11 being added need to stay online and available for I/Os through the same site in scenarios where both sites A and B can still be capable of surviving and servicing I/Os (e.g., as can be the case where the replication failure or fracture is due to failure of the replication link between sites A and B).

304 — While both the existing group GP1 and the stretched object S11 being added are in an active-active state with established bi-directional synchronous replication, the replication session object R1 that is associated with the stretched object S11 being added is deleted on both sites A and B. R1 can be included in a first layered services stack Q1 of the stretched resource S11 being added. The remaining objects RO1 of Q1 can be retained. The stretched resource is retained (e.g., both V1 of site A and V2 of site B are retained along with any existing content thereon); the existing replication configuration for S11 remains established and is retained; and any existing snapshots of S11 on sites A and B are retained.

402 — The metro replication configuration with respect to the group GP1 of stretched resources and the stretched resource or object S11 being removed from GP1 transitions into bias mode. The sites A and B of the metro replication configuration may already be in bias mode or may transition from a witness mode to bias mode. When in the witness mode, a third system or site C can serve as a witness which is in communication with the sites A and B, where the witness can facilitate selection of a single one of the sites A and B which continues servicing I/Os directed to the group members of GP1 and stretched resource S11 being removed responsive to a replication failure or fracture with respect to GP1 or S11.

Transitioning from witness mode to bias mode can include disengaging the witness from its witness role in connection with selecting the foregoing single site responsive to a replication failure or fracture with respect to GP1 or S11.

When in bias mode, only the preferred site can win or be selected as the single site which continues servicing I/Os directed to the group members of GP1 and stretched resource S11, responsive to a replication failure or fracture with respect to GP1 and S11. Responsive to the foregoing replication failure or fracture, both the group GP1 and the stretched resource S11 need to stay online and available for I/Os through the same site in scenarios where both sites A and B can still be capable of surviving and servicing I/Os (e.g., as can be the case where the replication failure or fracture is due to failure of the replication link between sites A and B).

404 — A new replication session object R1 is created for S11 on both sites A and B.

406 — While all members (including S11) of GP1 are in an active-active state with established bi-directional synchronous replication, S11 is moved out or removed from GP1 while retaining the layered services stack portion P1 associated with S11. P1 can be included in a layered services stack Q2 associated with GP1. Thus P1 can be disassociated with or unlinked from Q2. The stretched resource S11 is retained (e.g., both V1 of site A and V2 of site B are retained along with any existing content thereon); the existing replication configuration for S11 remains established and is retained; and any existing snapshots of S11 on sites A and B are retained.

FIG. 9A

TECHNIQUES FOR ADDING AND REMOVING STORAGE OBJECTS FROM GROUPS

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: establishing a first synchronous replication configuration for a group of one or more existing stretched resources, wherein each of the existing stretched resources of the group is configured from a first local resource of a first site and a second local resource of a second site, wherein the first local resource of the first site and the second local resource of the second site for said each existing stretched resource are configured to have a same resource identity as presented to a host; establishing a second synchronous replication configuration for a first stretched resource, wherein the first stretched resource is configured as an existing stretched resource from a third local resource of the first site and a fourth local resource of the second site, wherein the third local resource of the first site and the fourth local resource of the second site for said first stretched resource are configured to have a same first resource identity as presented to the host; and performing first processing that adds the first stretched resource to the group of one or more existing stretched resources, wherein the first stretched resource is configured as an existing stretched resource prior to performing said first processing, wherein said first processing includes: while retaining a first remaining portion of a first layered services stack of the first site that corresponds to the first stretched resource, deleting a first replication session object of the first layered services stack of the first site; while retaining a second remaining portion of a second layered services stack of the second site that corresponds to the first stretched resource, deleting a second replication session object of the second layered services stack of the second site; associating the first remaining portion of the first layered services stack, corresponding to the first stretched resource, with a third replication session object of a third layered services stack of the first site corresponding to the group thereby adding the first remaining portion of the first layered services stack to the third layered services stack corresponding to the group on the first site; and associating the second remaining portion of the second layered services stack, corresponding to the first stretched resource, with a fourth replication session object of a fourth layered services stack of the second site corresponding to the group thereby adding the second remaining portion of the second layered services stack to the fourth layered services stack corresponding to the group on the second site.

In at least one embodiment, for each of the existing stretched resources of the group configured from the first local resource of a first site and the second local resource of a second site, the first local resource can be exposed to the host over a first path between the first site and the host, wherein the second local resource can be exposed to the host over a second path between the second site and the host. The host can identify the first path and the second path as two paths to said each existing stretched resource having the same resource identity. Each of the existing stretched resources of the group can be configured for two-way or bi-directional synchronous replication wherein there may be synchronous replication of writes from the first local resource of the first site to the second local resource of the second site for said each existing stretched resource, and synchronous replication of writes from the second local resource of the second site to the first local resource of the first site for said each existing stretched resource. The third local resource can be exposed to the host over the first path between the first site and the host, wherein the fourth local resource can be exposed to the host over the second path between the second site and the host, and wherein the host can identify the first path and the second path as two paths to the first stretched resource having the same first resource identity. The first stretched resource can be configured for two-way or bi-directional synchronous replication wherein there may be synchronous replication of writes from the third local resource of the first site to the fourth local resource of the second site for said first stretched resource, and synchronous replication of writes from the fourth local resource of the second site to the third local resource of the first site for said first stretched resource.

In at least one embodiment, prior to performing the first processing, the one or more existing stretched resources of the group and the first stretched resource can be in an active-active mode wherein the first path can be configured as active with respect to the one or more existing stretched resources of the group and the first stretched resource so the host issues I/Os directed to the one or more existing stretched resources of the group over the first path and issues I/Os directed to the first stretched resource over the first path. The second path can be configured as active with respect to the one or more existing stretched resources of the group and the first stretched resources so the host issues I/Os directed to the one or more existing stretched resources of the group over the second path and issues I/Os directed to the first stretched resource over the second path. While deleting the first replication session object of the first layered services stack of the first site and while deleting the second replication session object of the second layered services stack of the second site, the one or more existing stretched resources of the group and the first stretched resource can be in the active-active mode and also bi-directionally synchronously replicating writes between the first site and the second site.

In at least one embodiment, the first processing can include configuring the first site and the second site in a bias mode with respect to the first synchronous replication configuration for the group and the second synchronous replication configuration of the first stretched resource, wherein when in the bias mode, a specified one of the first site and the second site currently configured as the preferred site is designated as a single site which services I/Os directed to stretched resources of the group responsive to a failure or fracture of replication with respect to the group or the first stretched resource, and wherein when in the bias mode and responsive to a failure or fracture of replication with respect to the group or the first stretched resource, the non-preferred site is unavailable for servicing I/Os directed to any stretched resource of the group. Configuring the first site and the second site in the bias mode can further include transitioning the first site and the second site from a witness mode to the bias mode. Subsequent to completing the first processing, the method can include transitioning from the bias mode back to the witness mode. When in the witness mode, a third site or system can serve as a witness and can be configured for communication with the first site and the second site. Responsive to a failure or fracture of replication with respect to the group or the first stretched resource, the witness can be used in deciding which of the first site and the second site continues servicing I/Os directed to stretched resources of the group and the first stretched resource.

In at least one embodiment, for each of the existing stretched resources of the group configured from the first local resource of a first site and the second local resource of a second site, the first local resource can be exposed to the host over a first path between the first site and the host. Each of the existing stretched resources of the group can be configured for one-way synchronous replication wherein there may be synchronous replication of writes from the first local resource of the first site to the second local resource of the second site for said each existing stretched resource. The third local resource can be exposed to the host over the first path between the first site and the host. The first stretched resource can be configured for one-way synchronous replication wherein there may be synchronous replication of writes from the third local resource of the first site to the fourth local resource of the second site for said first stretched resource.

In at least one embodiment, processing can include: retaining first snapshots taken of the third local resource configured as the first stretched resource on the first site; and retaining second snapshots taken of the fourth local resource configured as the first stretched resource on the second site. Processing can include retaining the second synchronous replication configuration of the first stretched resource. Processing can include retaining the first stretched resource, including retaining content of the third local resource and content of the second local resource both configured as the first stretched resource. Subsequent to completing the first processing, processing can include: creating a first recovery snapshot of the group on the first site; and creating a second recovery snapshot of the first group on the second site.

In at least one embodiment, the first stretched resource and each the one or more existing stretched resources can be a first resource type of a plurality of defined resource types. The plurality of defined resource types can include one or more of: a volume, a logical device; a file; a file system; a sub-volume portion; a virtual volume used by a virtual machine; a portion of a virtual volume used by a virtual machine; and a portion of a file system.

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: establishing a first synchronous replication configuration for a group of one or more existing stretched resources, wherein each of the existing stretched resources of the group is configured from a first local resource of a first site and a second local resource of a second site, wherein the first local resource of the first site and the second local resource of the second site for said each existing stretched resource are configured to have a same resource identity as presented to a host; and performing first processing that removes a first stretched resource from the group, wherein said first processing includes: creating a first replication session object for the first stretched resource on the first site; creating a second replication session object for the first stretched resource on the second site; while all members of the group are in an active-active state and synchronously replicate data in accordance with the first synchronous replication configuration, removing the first stretched resource from the group on the first site and the second site while retaining a first current configuration of the first stretched resource, wherein the first current configuration retained includes a first portion of a first layered services stack of the first site, wherein the first portion corresponds to the first stretched resource, and wherein the first layered services stack corresponds to the group on the first site, and wherein the first current configuration retained includes a second portion of a second layered services stack of the second site, wherein the second portion corresponds to the first stretched resource, and wherein the second layered services stack corresponds to the group on the second site; associating the first stretched resource with the first replication session object on the first site, wherein said associating the first stretched resource includes associating the first portion of the first layered services stack with the first replication object corresponding to the first stretched resource on the first site thereby forming a third layered services stack corresponding to the first stretched resource on the first site; and associating the first stretched resource with the second replication session object on the second site, wherein said associating the second stretched resource includes associating the second portion of the second layered services stack with the second replication object corresponding to the first stretched resource on the second site thereby forming a fourth layered services stack corresponding to the first stretched resource on the second site.

In at least one embodiment, subsequent to completing the first processing, processing can include taking a first snapshot of the group; and taking a second snapshot of the first stretched resource independently of the group. Taking the first snapshot of the group can include taking a snapshot of each member of the group on both the first site and the second site.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 8A, 8B, 9A and 9B are flowcharts of processing steps that can be performed in at least one embodiment in accordance with the techniques of the present disclosure.

DETAILED DESCRIPTION OF EMBODIMENT(S)

Figure 1:
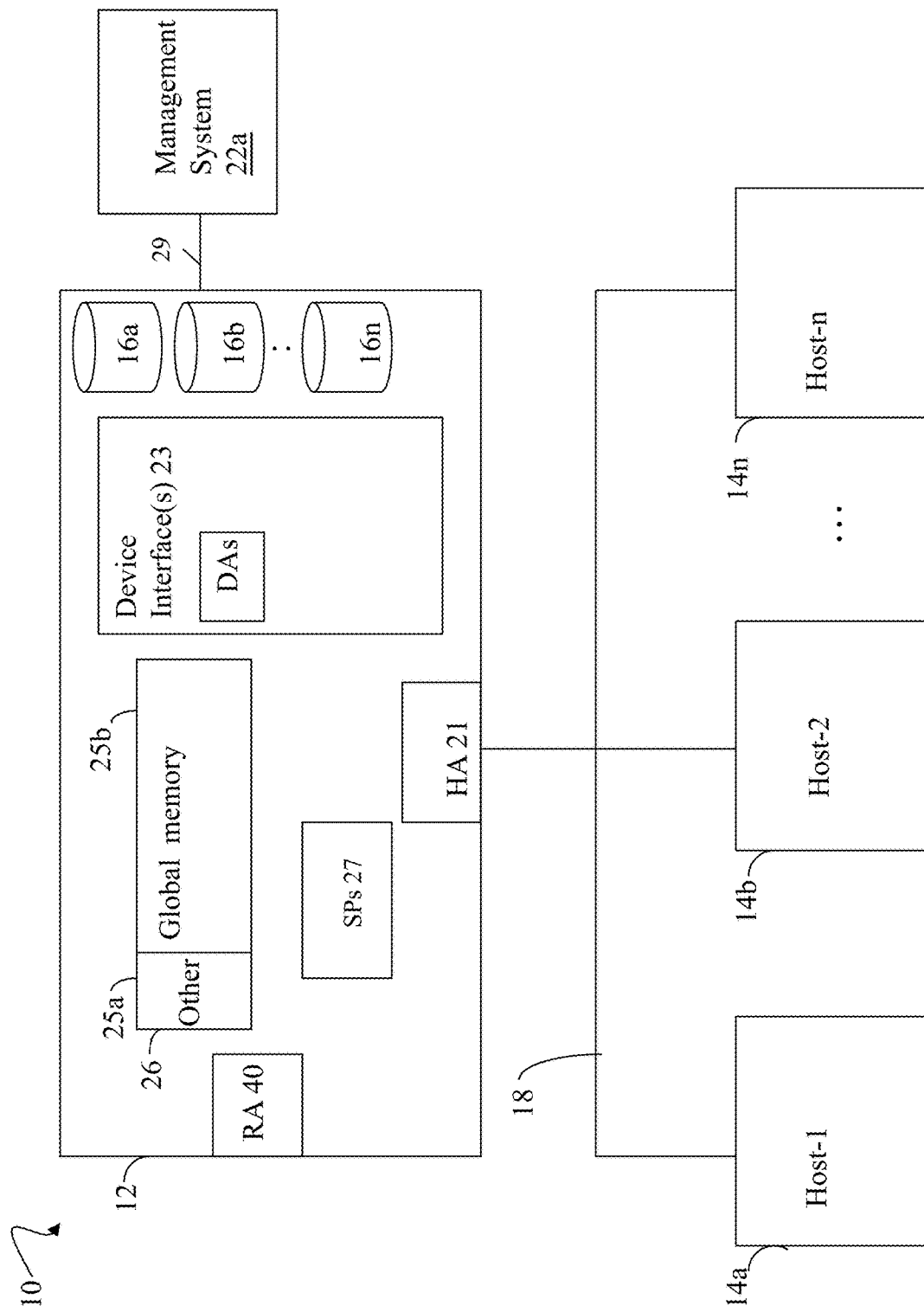
FIG. 1 is an example of components that can be included in a system in accordance with the techniques of the present disclosure.

Two data storage systems, sites or data centers, such as "site or system A" and "site or system B", can present a single data storage resource or object, such as a volume or logical device, to a client, such as a host. The volume can be configured as a stretched volume or resource where a first volume V1 on site A and a second volume on site B are both configured to have the same identity from the perspective of the external host. The stretched volume can be exposed over paths going to both sites A and B. In a metro replication configuration (sometimes simply referred to as a metro configuration), the host can issue writes to the stretched volume over paths to both site A and site B, where writes to the stretched volume on each of the sites A and B are automatically synchronously replicated to the other peer site. In this manner with the metro replication configuration, the two data storage systems or sites can be configured for two-way or bi-directional synchronous replication for the configured stretched volume.

The stretched volume can provide data protection due to the synchronous mirroring of data maintained on V1 of site A and V2 of site B. For example, if site A experiences a disaster or is otherwise unavailable, the V2 copy of the stretched volume on site B can be used by the storage clients rather than have the storage clients undesirably experience data unavailability of the stretched volume. Alternatively, if site B experiences a disaster or is otherwise unavailable, the copy of the stretched volume V1 on site A can be used by the storage clients rather than have the storage clients undesirably experience data unavailability of the stretched volume. Thus, the various resources, including computing, networking and storage resources, on the two sites A and B can provide the needed redundancy for a user's application, such as an application executing on a host which reads data from and/writes data to the stretched volume.

Other uses of a stretched volume or LUN can include, for example, resource balancing across sites A and B; and storage migration such as migration of data from V1 of site A to V2 of site B, where V1 and V2 are configured as the same stretched LUN or volume.

A stretched volume or LUN can generally denote a single stretched storage resource or object configured from two local storage resources, objects or copies, respectively, on the two different storage systems A and B, where the local two storage resources are configured to have the same identity as presented to a host or other external client. Sometimes, a stretched volume or LUN can also be referred to herein as a metro volume or LUN. More generally, sometimes a stretched storage resource or object can be referred to herein as a metro storage object or resource.

A storage object group or resource group construct can also be utilized where the group can denote a logically defined grouping of one or more storage objects or resources. In particular, a stretched or metro volume group can denote a logically defined grouping of one or more stretched volumes or LUNs. More generally, a stretched or metro storage resource group or object group can denote a logically defined grouping of one or more stretched objects or resources.

The foregoing group construct of resources or objects can be used to any suitable purpose depending on the particular functionality and services supported for the group. For example, data protection can be supported at the group level such as in connection with snapshots. Taking a snapshot of the group can include taking a snapshot of each of the members at the same point in time. The group level snapshot can provide for taking a snapshot of all group members and providing for write order consistency among all snapshots of group members.

An application executed on a host can use such group constructs to create consistent write-ordered snapshots across all volumes, storage resources or storage objects in the group. Applications that require disaster tolerance can use the metro configuration with a volume group to have higher availability. Consistent with other discussion herein, such a volume group of metro or stretched volumes can be referred to as a metro volume group. At a first point in time, a metro volume group GP1 can include multiple metro or stretched volumes. Subsequently at a second point in time, application requirements can change such that membership to the metro volume group GP1 can also accordingly change. For example, one or more new stretched LUNs or volumes can be added to GP1. As another example, one or more existing stretched LUNs or volumes of GP1 can be removed from the metro volume group GP1. When a data storage system customer or user makes such changes as noted above, the modification to GP1 needs to be coordinated across both storage systems in a metro configuration.

A typical implementation is to configure the group construct such as the metro volume group GP1 first and then add volumes into the group. If there is already existing data on the volumes being added to the group, resynchronization is required. In particular, if a metro volume is to be added to a metro volume group, the metro volume needs to be initially configured as a local, regular or non-stretched volume on a single system, added to the group, and then the group can be resynchronized with the peer storage system. Additionally, existing implementations can temporarily pause or stop replication for the group while the new member is added, and can then resynchronize all members.

The foregoing existing implementation is inefficient in that synchronization/resynchronization can be required for members of GP1. Furthermore, the foregoing is inefficient in that in order to add a metro volume into the metro volume group, the volume must first be configured as a local volume, whereby in the existing implementation, an existing metro volume cannot be directly added into the metro volume group.

Described in the following paragraphs are techniques of the present disclosure which overcome the foregoing disadvantages and provide for adding metro volumes to and/or removing metro volumes from a metro volume group such as GP1 in a more efficient manner.

In at least one embodiment when adding an existing metro volume or LUN to a metro volume group such as GP1, the existing metro volume or LUN can be directly added into GP1 without requiring resynchronization.

In at least one embodiment when removing a metro volume from GP1, the removed metro volume can remain a metro volume.

In at least one embodiment, the techniques of the present disclosure provide for adding an existing metro volume to GP1 without pausing or stopping replication for any existing member of GP1 and without pausing or stopping replication for the existing metro volume being added to GP1. In this manner, bi-directional replication can continue for both existing members of GP1 as well as the existing metro volume being added while performing the workflow to add the existing metro volume to GP1. As a result of not pausing or stopping replication for both existing members of GP1 as well as the existing metro volume being added to GP1, resynchronization is not needed for existing GP1 members and is not needed for the existing metro volume added as a new member to GP1.

The techniques of the present disclosure can be used in connection with metro configurations implemented in accordance with any suitable standard or protocol. For example, in at least one embodiment, the techniques of the present disclosure can be implemented in accordance with the SCSI standard, the NVMe-oF (Non-Volatile Memory Express over Fabrics) standard, as well as any other suitable standard or protocol.

In at least one embodiment, a metro group (also sometimes referred to as a metro storage resource or object group) can also be generally referred to as a group of stretched storage resources or objects.

In at least one embodiment, the techniques of the present disclosure provide for efficiently adding and removing members from a metro group while keeping such added or removed members as configured as metro objects.

The techniques of the present disclosure can be used in connection with a metro volume group of metro storage resources or objects configured for two-way or bi-directional synchronous replication. However, more generally, the techniques of the present disclosure can be used in connection with other replication configurations. For example, the techniques of the present disclosure can be used in connection with synchronous replication configurations based on one-way synchronous replication such as replication of content of stretched volume or object members from site A to site B.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
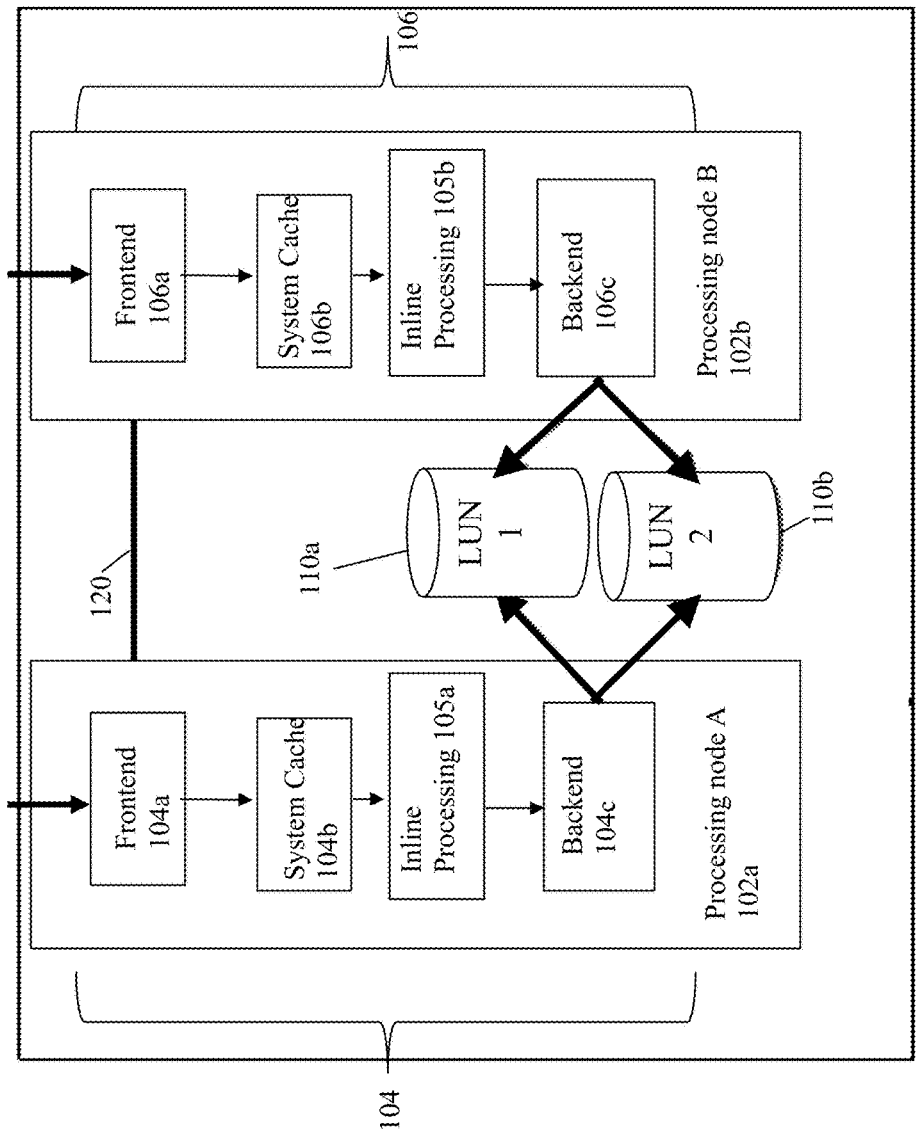
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be described and represented as the nodes 102*a-b* in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as a synchronous mode described elsewhere herein.

Figure 3:
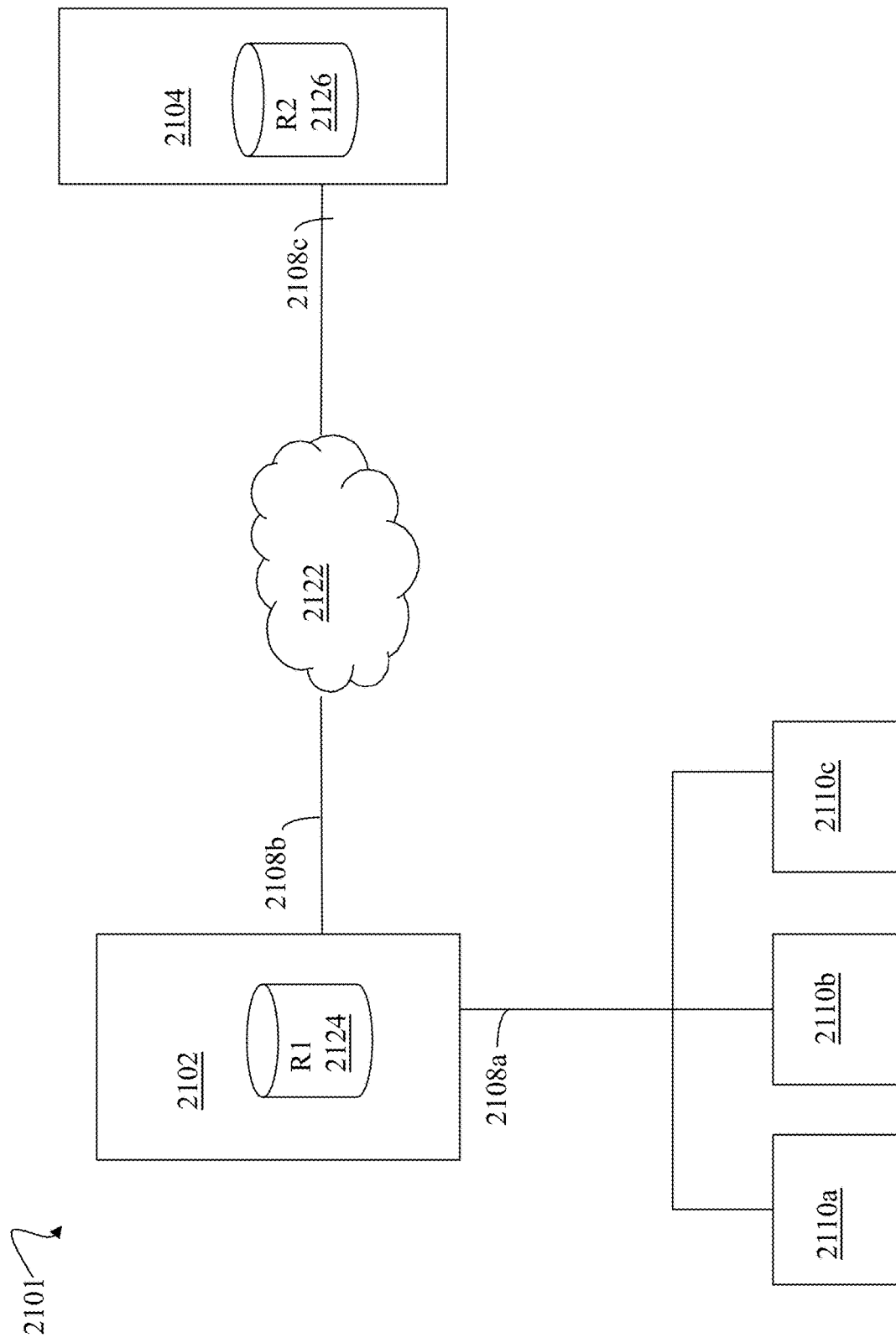
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110*a*, 2110*b* and 1210*c*. The data storage systems 2102, 2104 can be remotely connected and communicate over the network 2122, such as the Internet or other private network, and facilitate communications with the components connected thereto. The hosts 2110*a*, 2110*b* and 2110*c* can issue I/Os and other operations, commands, or requests to the data storage system 2102 over the connection 2108*a*. The hosts 2110*a*, 2110*b* and 2110*c* can be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 2104 can be characterized as remote with respect to the hosts 2110a, 2110b and 2110c. The R1 and R2 devices can be configured as LUNs.

The host 2110a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 2110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With synchronous mode remote data replication in at least one embodiment, a host 2110a can issue a write to the R1 device 2124. The primary or R1 data storage system 2102 can store the write data in its cache at a cache location and mark the cache location as including write pending (WP) data as mentioned elsewhere herein. At a later point in time, the write data is destaged from the cache of the R1 system 2102 to physical storage provisioned for the R1 device 2124 configured as the LUN A. Additionally, the RRF operating in the synchronous mode can propagate the write data across an established connection or link (more generally referred to as a the remote replication link or link) such as over 2108b, 2122, and 2108c, to the secondary or R2 data storage system 2104 where the write data is stored in the cache of the system 2104 at a cache location that is marked as WP. Subsequently, the write data is destaged from the cache of the R2 system 2104 to physical storage provisioned for the R2 device 2126 configured as the LUN A. Once the write data is stored in the cache of the system 2104 as described, the R2 data storage system 2104 can return an acknowledgement to the R1 data storage system 2102 that it has received the write data. Responsive to receiving this acknowledgement from the R2 data storage system 2104, the R1 data storage system 2102 can return an acknowledgement to the host 2110a that the write has been received and completed. Thus, generally, R1 device 2124 and R2 device 2126 can be logical devices, such as LUNs, configured as synchronized data mirrors of one another. R1 and R2 devices can be, for example, fully provisioned LUNs, such as thick LUNs, or can be LUNs that are thin or virtually provisioned logical devices.

Figure 4:
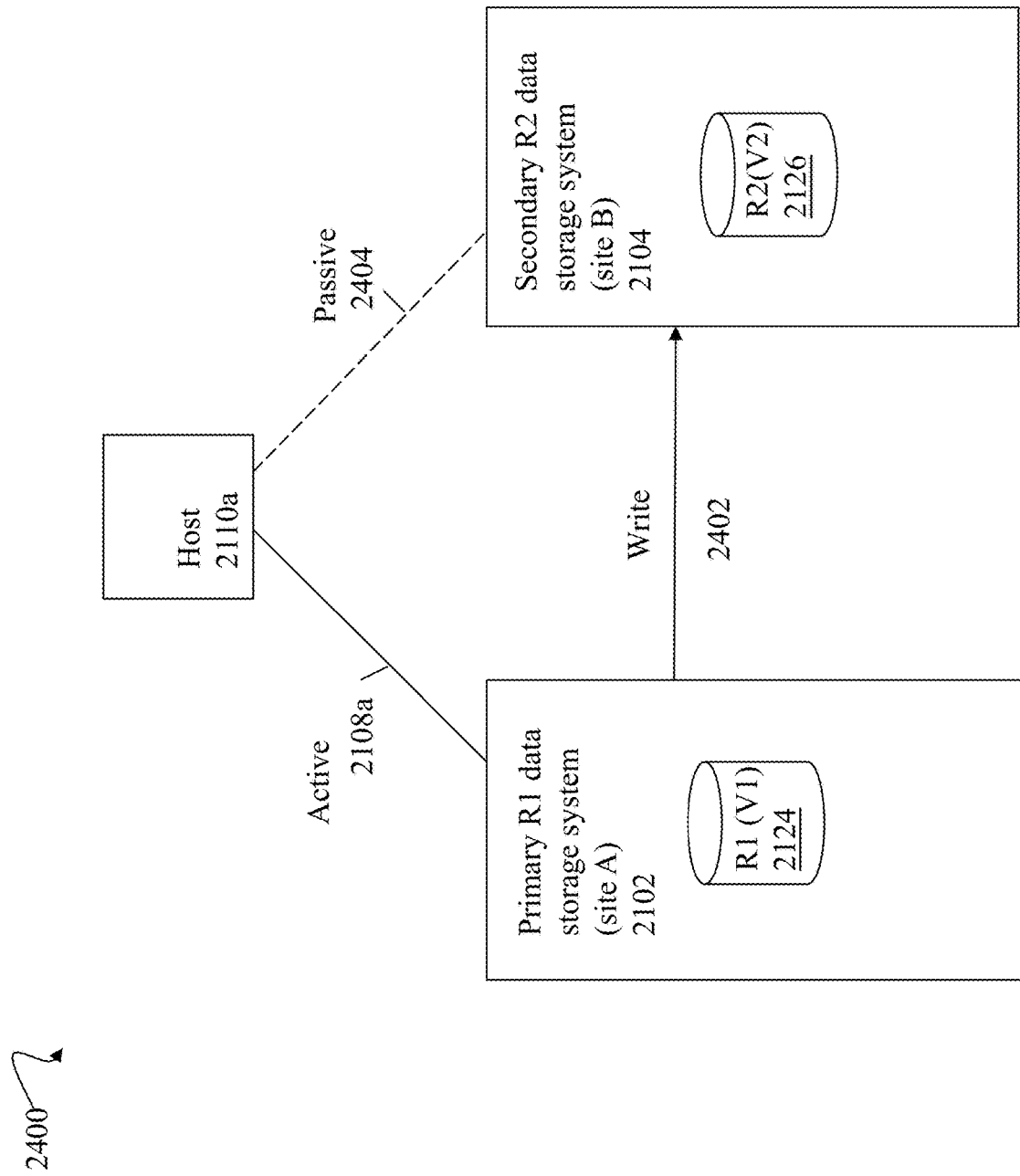
FIG. 4 is an example illustrating an active-passive replication configuration of a stretched volume using one-way synchronous replication in at least one embodiment in accordance with the techniques of the present disclosure.

With reference to FIG. 4, shown is a further simplified illustration of components that can be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 can also be referred to herein as an active-passive configuration with synchronous replication performed from the R1 data storage system 2102 to the secondary R2 system 2104. With the active-passive configuration of FIG. 4, the host 2110a has an active connection or path 2108a over which all I/Os are issued to only the R1 data storage system. The host 2110a can have a passive connection or path 2404 to the R2 data storage system 2104. Writes issued over path 2108a to the R1 system 2102 can be synchronously replicated to the R2 system 2104.

In the configuration of 2400, the R1 device 2124 and R2 device 2126 can be configured and identified as the same LUN, such as LUN A, to the host 2110a. Thus, the host 2110a can view 2108a and 2404 as two paths to the same LUN A, where path 2108a is active (over which I/Os can be issued to LUN A) and where path 2404 is passive (over which no I/Os to the LUN A can be issued whereby the host is not permitted to access the LUN A over path 2404). For example, in a SCSI-based environment, the devices 2124 and 2126 can be configured to have the same logical device identifier such as the same world-wide name (WWN) or other identifier as well as having other attributes or properties that are the same. Should the connection 2108a and/or the R1 data storage system 2102 experience a failure or disaster whereby access to R1 2124 configured as LUN A is unavailable, processing can be performed on the host 2110a to modify the state of path 2404 to active and commence issuing I/Os to the R2 device configured as LUN A. In this manner, the R2 device 2126 configured as LUN A can be used as a backup accessible to the host 2110a for servicing I/Os upon failure of the R1 device 2124 configured as LUN A.

The pair of devices or volumes including the R1 device 2124 and the R2 device 2126 can be configured as the same single volume or LUN, such as LUN A. In connection with discussion herein, the LUN A configured and exposed to the host can also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110a, the same LUN A is exposed over the two paths 2108a and 2404.

It should be noted although only a single replication link 2402 is illustrated, more generally any number of replication links can be used in connection with replicating data from systems 2102 to system 2104.

Figure 5:
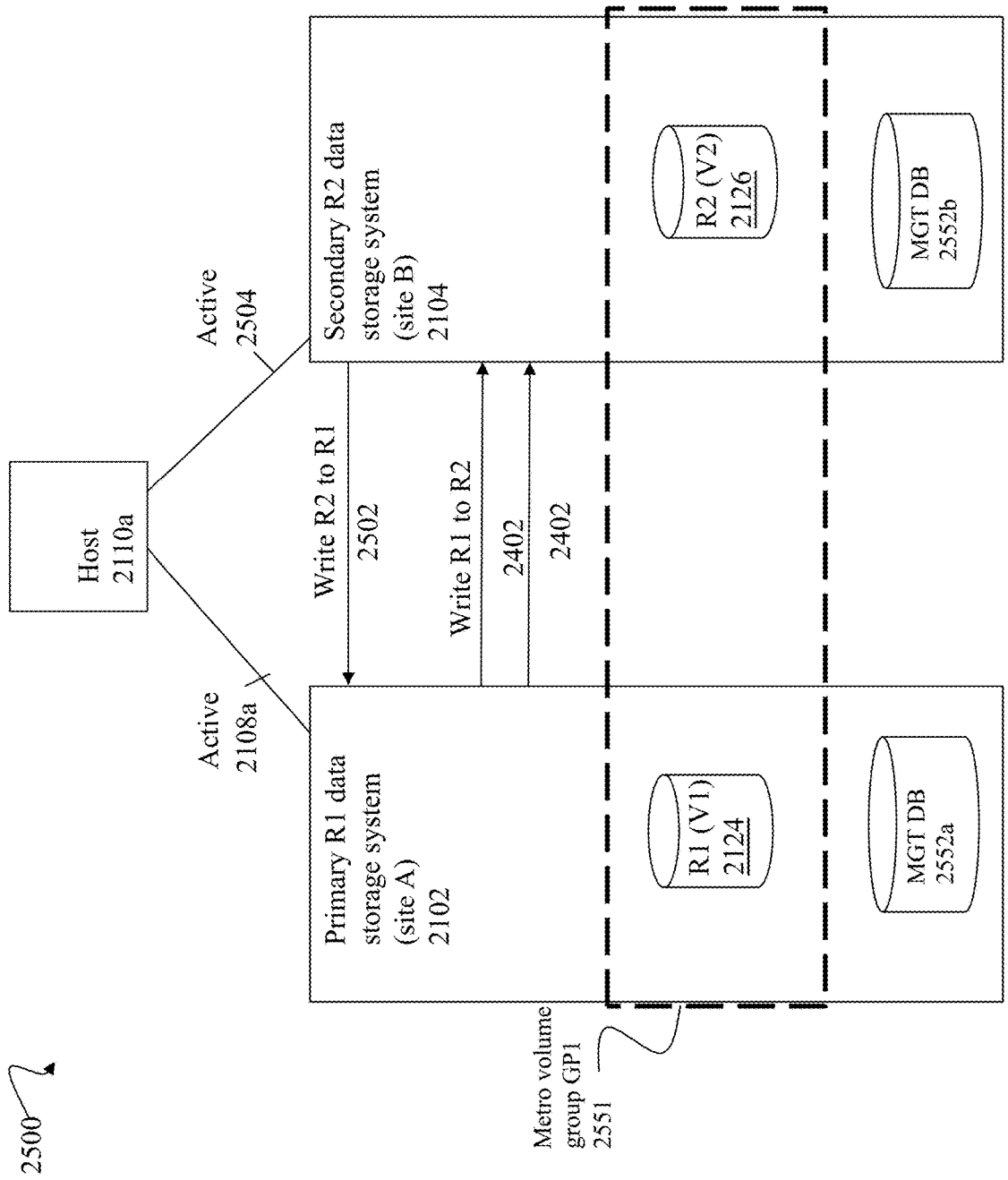
FIG. 5 is an example illustrating an active-active replication configuration of a stretched volume using two-way or bidirectional synchronous replication in at least one embodiment in accordance with the techniques of the present disclosure.

Referring to FIG. 5, shown is an example configuration of components that can be used in an embodiment. The example 2500 illustrates an active-active configuration as can be used in connection with synchronous replication in at least one embodiment. In the active-active configuration or state with synchronous replication, the host 2110a can have a first active path 2108a to the R1 data storage system and R1 device 2124 configured as LUN A. Additionally, the host 2110a can have a second active path 2504 to the R2 data storage system and the R2 device 2126 configured as the same LUN A. From the view of the host 2110a, the paths 2108a and 2504 appear as 2 paths to the same LUN A as described in connection with FIG. 4 with the difference that the host in the example 2500 configuration can issue I/Os, both reads and/or writes, over both of the paths 2108a and 2504 at the same time.

In at least one embodiment as discussed in more detail below, in a replication configuration of FIG. 5 with an active-active configuration where writes can be received by both systems or sites 2124 and 2126, a predetermined or designated one of the systems or sites 2124 and 2126 can be assigned as the preferred system or site, with the other remaining system or site assigned as the non-preferred system or site. In such an embodiment with a configuration as in FIG. 5, assume for purposes of illustration that system or site R1/A is preferred and the system or site R2/B is the non-preferred.

The host 2110a can send a first write over the path 2108a which is received by the preferred R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110a over the path 2108a, where the acknowledgement indicates to the host that the first write has completed.

The first write request can be directly received by the preferred system or site R1 2102 from the host 2110a as noted above. Alternatively in a configuration of FIG. 5 in at least one embodiment, a write request, such as the second write request discussed below, can be initially received by the non-preferred system or site R2 2104 and then forwarded to the preferred system or site 2102 for servicing. In this manner in at least one embodiment, the preferred system or site R1 2102 can always commit the write locally before the same write is committed by the non-preferred system or site R2 2104. In particular, the host 2110a can send the second write over the path 2504 which is received by the R2 system 2104. The second write can be forwarded, from the R2 system 2104 to the R1 system 2102, over the link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the preferred R1 system 2102 (e.g., indicating that the second write is committed by the R1 system 2102), the R1 system 2102 sends an acknowledgement over the link 2502 to the R2 system 2104 where the acknowledgment indicates that the preferred R1 system 2102 has locally committed or locally completed the second write on the R1 system 2102. Once the R2 system 2104 receives the acknowledgement from the R1 system, the R2 system 2104 performs processing to locally complete or commit the second write on the R2 system 2104. In at least one embodiment, committing or completing the second write on the non-preferred R2 system 2104 can include the second write being written to the cache of the R2 system 2104 where, at a later point in time, the second write is destaged from the cache of the R2 system 2104 to physical storage provisioned for the R2 device 2126 configured as the LUN A. Once the second write is written to the cache of the R2 system 2104, the R2 system 2104 then returns an acknowledgement to the host 2110a over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110a, the same stretched LUN A is exposed over the two active paths 2504 and 2108a.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108a to the system 2102 is stored on the R1 device 2124 and also transmitted to the system 2104 over 2402. The write sent over 2402 to system 2104 is stored on the R2 device 2126. Such replication is performed synchronously in that the received host write sent over 2108a to the data storage system 2102 is not acknowledged as successfully completed to the host 2110a unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that FIG. 5 illustrates a configuration with only a single host connected to both systems 2102, 2104 of the metro cluster. More generally, a configuration such as illustrated in FIG. 5 can include multiple hosts where one or more of the hosts are connected to both systems 2102, 2104 and/or one or more of the hosts are connected to only a single of the systems 2102, 2104.

Although only a single link 2402 is illustrated in connection with replicating data from systems 2102 to system 2104, more generally any number of links can be used. Although only a single link 2502 is illustrated in connection with replicating data from systems 2104 to system 2102, more generally any number of links can be used. Furthermore, although 2 links 2402 and 2502 are illustrated, in at least one embodiment, a single link can be used in connection with sending data from system 2102 to 2104, and also from 2104 to 2102.

FIG. 5 illustrates an active-active remote replication configuration for the stretched LUN A. The stretched LUN A is exposed to the host 2110a by having each volume or device of the device pair (R1 device 2124, R2 device 2126) configured and presented to the host 2110a as the same volume or LUN A. Additionally, the stretched LUN A is configured for two way synchronous remote replication between the systems 2102 and 2104 respectively including the two devices or volumes of the device pair, (R1 device 2124, R2 device 2126).

In the following paragraphs, sometimes the configuration of FIG. 5 can be referred to as a metro configuration or a metro replication configuration. In the following paragraphs, sometimes the configuration of FIG. 4 can be referred to as a synchronous (sync) configuration, synchronous (sync) replication configuration, or a one-way synchronous (sync) replication configuration. The configurations of FIGS. 4 and 5 include two data storage systems or data centers 2102 and 2104 which can more generally be referred to as sites. In the following paragraphs, the two systems, data centers or sites 2102 and 2104 can be referred to respectively as site A and site B.

Referring to FIG. 4 with the one way synchronous replication configuration with respect to the stretched volume or LUN A (e.g., more generally a stretched storage object or resource), the system or site A 2102 can sometimes be referred to as the sync active site with respect to the stretched volume or LUN due to the active path state 2108a, and the system or site B 2104 can sometimes be referred to as the sync passive site with respect to the stretched volume or LUN due the passive path state 2404.

Referring to FIG. 5 with the metro replication configuration, both systems or sites A 2102 and B 2104 are active with respect to the stretched volume or LUN due to the active path states 2108a and 2504. In at least one embodiment with a metro replication configuration, an active path with respect to a LUN or volume on a system or site can be further characterized as preferred or non-preferred. Thus, for example, the active paths 2108a and 2504 with respect to the stretched volume or LUN can be further characterized as preferred or non-preferred as discussed below in more detail.

In at least one embodiment, the sync replication configuration of FIG. 4 can actually be configured with two-way synchronous replication for the stretched LUN A (as in FIG. 5) rather than one-way synchronous replication. However, as in FIG. 4, the path 2108a can still be configured as active and the path 2404 can still be configured as passive. Thus, the host 2110a can still only have access to the content of the stretched LUN A over one or more active paths 2108a to the sync active site 2102 and can still have no access to the content of the stretched LUN A over one or more passive paths 2404 to the sync passive site 2104. Thus, in some embodiments, two-way synchronous replication for the stretched LUN A can actually be established or configured in the arrangement of FIG. 4 but effectively only one-way synchronous replication from the sync active site 2102 to the sync passive site 2104 is utilized. Put another way, effectively only one-way synchronous replication (from the sync active site 2102 to the sync passive site 2104) for the stretched LUN A can actually be utilized at any point in time since I/Os that are directed to the stretched LUN A and that are sent over the passive path 2404 to the sync passive site 2104 are not actually serviced (e.g., hence no synchronous replication is actually performed from the sync passive site 2104 to the sync active site 2102). Should the status of path 2108a transition to passive and the status of path 2404 transition to active, site 2102 transitions to the sync active role and site 2104 transitions to the sync passive role with one-way replication from the current sync active site 2104 to the current sync passive site 2102.

In an embodiment described herein, the systems or sites 2102 and 2104 can be a SCSI-based system such as SCSI-based data storage array, data center, or appliance. An embodiment in accordance with the techniques herein can include hosts and data storage systems, centers or sites which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a volume or LUN's access state with respect to a particular initiator port and the target port. Thus, in accordance with the ALUA standard, various access states may be associated with a path with respect to a particular device, such as a LUN or volume. In particular, the ALUA standard defines such access states including the active-optimized, active-non optimized, unavailable, and other states. The ALUA standard also defines other access states. A recognized path (such as recognized by a host as a result of discovery processing) over which I/Os (e.g., read and write I/Os) can be issued to access data of a LUN can have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a "preferred" path state for the particular LUN. A path for a particular LUN having the active-non optimized (or unoptimized) path state may also be referred to herein as a non-optimized or "non-preferred" path for the particular LUN. Thus active-non-optimized denotes a "non-preferred" path state with respect to the particular LUN. Generally, I/Os directed to a LUN that are sent by the host to the data storage system over active-optimized and active-non optimized paths are processed or serviced by the data storage system. However, the host may select to send I/Os to a LUN from those preferred paths having an active-optimized state for the LUN. The host may proceed to use a non-preferred path having an active-unoptimized state for the LUN only if there is no preferred or no active-optimized path for the LUN. In this manner, setting a path to active-optimized with respect to a particular LUN can result in hosts using such active-optimized paths over any existing active non-optimized paths to the same LUN. Should there be no active-optimized path availability for the LUN, the host can then utilize an existing active non-optimized path to the LUN.

Referring again to FIG. 5 in at least one embodiment, the active path 2108a to the system or site A 2102 can be a preferred path for the stretched volume or LUN, where the system or site A 2102 can be sometimes referred to as a metro preferred site. In at least one embodiment with reference to FIG. 5, the active path 2504 to the system or site B 2104 can be a non-preferred path for the stretched volume or LUN, where the system or site B 2104 can be sometimes referred to as a metro non-preferred site.

Although examples in the following paragraphs refer to a stretched volume or LUN, more generally, the techniques of the present disclosure can be generalized for use with a stretched object or resource which can be a volume or LUN, a file system, a virtual volume or vvol used in connection with virtual machines, and any other suitable storage resource or object. The stretched volume or LUN, LUN A, can be configured from a volume pair (V1, V2), where V1 is in site A and V2 is in site B, where V1 and V2 are both configured as the same logical volume or LUN A, where V1 and V2 both have the same identity as presented, viewed or exposed to an external host.

Discussion and examples of the following paragraphs with respect to the specific stretched volume LUN A assume that site A is the preferred site for metro replication (e.g., FIG. 5) and that site B is the non-preferred site for metro replication. Generally, the techniques of the present disclosure can be used in configurations of metro replication as in FIG. 5. In at least one embodiment, writes from hosts directed to a stretched volume can be committed to site A, the metro preferred site first and then committed to the metro non-preferred site B.

In some cases, a stretched volume such as LUN A can also be referred to herein as a metro volume configured in a metro configuration or metro replication configuration as in FIG. 5 with bi-directional or two-way synchronous replication as discussed above.

Metro volume groups can be used to maintain and preserve write consistency and dependency across all stretched or metro LUNs or volumes which are members of the metro volume group. Thus, write consistency can be maintained across, and with respect to, all stretched LUNs (or more generally all resources or objects) of the metro volume group whereby, for example, all members of the metro volume group denote copies of data with respect to a same point in time. In at least one embodiment, a snapshot can be taken of a metro volume group at a particular point in time, where the group-level snapshot includes snapshots of all LUNs or volumes of the metro volume group across both sites or systems A and B where such snapshots of all LUNs or volumes are write order consistent. Thus such a metro volume group level snapshot of a metro volume group GP1 can denote a crash consistent and write order consistent copy of the stretched LUNs or volumes which are members of the metro volume group GP1. To further illustrate, a first write W1 can write to a first stretched volume or LUN 10 of GP1 at a first point in time. Subsequently at a second point in time, a second write W2 can write to a second stretched volume or LUN 11 of GP1 at the second point in time. A metro volume group snapshot of GP1 taken at a third point in time immediately after completing the second write W2 at the second point in time can include both W1 and W2 to maintain and preserve the write order dependency as between W1 and W2. For example, the metro volume group snapshot of GP1 at the third point in time would not include W2 without also including W1 since this would violate the write order consistency of the metro volume group. Thus, to maintain write consistency of the metro volume group, a snapshot is taken at the same point in time across all volumes, LUNs or other resources or objects of the metro volume group to keep the point-in-time image write order consistent for the entire group.

Consistent with other discussion herein, replication failure can be caused by three major classes of faults or failures. In a metro configuration for purposes of illustration and discussion in the following paragraphs, assume that site A is configured as the preferred site and that site B is configured as the non-preferred site. The following denotes how the different classes of faults or failures can be typically handled from an application and user perspective. Differences or modification to those typical notes below are discussed in more detail in subsequent paragraphs:

1. Loss of storage system or appliance in site A: Site A can be the preferred site for a metro replication configuration. Typically, on loss of the storage system or appliance on site A and without witness deployment, an explicit action by the user can be performed in at least one embodiment to set site B to the metro preferred site. If a witness is deployed, the witness can facilitate ensuring that site B is promoted to the metro preferred site such that host access to site B provides high availability. When site A subsequently becomes available and comes online so as to be in a normal healthy working state, the contents or data of V2 of site B needs to be resynchronized with the contents or data of V1 of site A. Generally, a witness can be another system or component in communication with sites A and B as part of the replication configuration. The witness can facilitate decision-making such as for promotion of site B to the metro preferred site.

2. Loss of storage appliance in site B: Since site A is already designated as the preferred metro site for metro replication site, site A can continue its role as the metro preferred site. When site B recovers and comes online, contents or data of V1 of site A needs to be resynchronized the data or contents of V2 of site B.

3. Loss of networking or replication link between site A and site B: Since site A is already designated as the preferred metro site for metro replication, site A can continue its role as the metro preferred site. When the networking or replication link recovers, contents or data of V1 of site A needs to be resynchronized with the data or contents of V2 of site B. In a metro configuration with a witness, the replication link can fail but both sites A and B can be available and online and both sites A and B can communicate with the witness. To avoid data inconsistency between sites A and B in an active-active metro configuration, the witness can facilitate communications between sites A and B to allow site A to continue receiving and servicing I/Os of the stretched LUN A thus continue as the metro preferred site. The witness can also instruct site B to become unavailable and not service I/Os directed to the stretched LUN A until the replication link recovers or is restored to a healthy state for use in replication between sites A and B.

Described in the following paragraphs are examples illustrating use of the techniques of the present disclosure with an active-active metro configuration as in FIG. 5 where the stretched volume or LUN is configured for bi-directional or two-way synchronous replication. More generally, the techniques of the present disclosure can be used in connection with other replication configurations. For example, the techniques of the present disclosure can also be used in connection with a stretched volume or LUN and metro volume groups of stretched LUNs or other stretched resources configured for one-way synchronous replication such as illustrated in FIG. 4.

Described in the following paragraphs are techniques of the present disclosure for adding metro volumes to and/or removing metro volumes from a metro volume group such as GP1 in a more efficient manner.

In at least one embodiment when adding an existing metro volume or LUN to a metro volume group such as GP1, the existing metro volume or LUN can be directly added into GP1 without requiring resynchronization.

In at least one embodiment when removing a metro volume from GP1, the removed metro volume can remain a metro volume.

In at least one embodiment, the techniques of the present disclosure provide for adding an existing metro volume to GP1 without pausing or stopping replication for any existing member of GP1 and without pausing or stopping replication for the existing metro volume being added to GP1. In this manner, bi-directional replication can continue for both existing members of GP1 as well as the existing metro volume being added while performing the workflow to add the existing metro volume to GP1. As a result of not pausing or stopping replication for both existing members of GP1 as well as the existing metro volume being added to GP1, resynchronization is not needed for existing GP1 members and is not needed for the existing metro volume added as a new member to GP1.

The techniques of the present disclosure can be used in connection with metro configurations implemented in accordance with any suitable standard or protocol. For example, in at least one embodiment, the techniques of the present disclosure can be implemented in accordance with the SCSI standard, the NVMe-oF (Non-Volatile Memory Express over Fabrics) standard, as well as any other suitable standard or protocol.

In at least one embodiment, a metro group (also sometimes referred to as a metro storage resource or object group) can also be generally referred to as a group of stretched storage resources or objects.

In at least one embodiment, the techniques of the present disclosure provide for efficiently adding and removing members from a metro group while keeping such added or removed members as configured as metro objects.

The techniques of the present disclosure can be used in connection with a metro volume group of metro storage resources or objects configured for two-way or bi-directional synchronous replication. However, more generally, the techniques of the present disclosure can be used in connection with other replication configurations. For example, the techniques of the present disclosure can be used in connection with synchronous replication configurations based on one-way synchronous replication such as replication of content of stretched volume or object members from site A to site B.

The foregoing and other aspects of the techniques of the present disclosure are described in more detail in the following paragraphs.

What will now be described is a first workflow of processing steps that can be performed in at least one embodiment in accordance with the techniques of the present disclosure to add an existing metro or stretched volume, such as LUN or volume A discussed above as in connection with FIG. 5, into an existing metro volume group GP1. In at least one embodiment, GP1 can include one or more members each of which can be a stretched volume or LUN configured for replication such as bi-directional synchronous replication.

In a first step S1, in the event of a replication failure during the first workflow to add LUN or volume A to GP1, processing can be performed to ensure that both the stretched LUN or volume A and GP1 are exposed and available for the I/O to the host from the same site or system, such as site A 2102. The foregoing can be accomplished in any suitable manner depending on the particular configuration and embodiment.

In particular, if the replication failure is due to failure of the replication link between sites A and B, both sites A and B can be healthy and able to remain online and service I/Os directed to both LUN A and GP1. However, due to the link failure, polarization or other logic can be configured to select only one of the sites A and B as the winner or sole surviving site which is to subsequently remain online servicing I/Os to both LUN A and GP1.

In some embodiments as discussed herein, a witness can be used in connection with implementations to decide a winner denoting which of the systems or sites A and B continues servicing I/Os directed to the metro volume group if there is a replication failure or fracture with respect to the metro volume group GP1. In such an embodiment in which a witness is deployed such that the replication configuration is operating in a witness mode, the step S1 can include removing, disconnecting or disengaging the sites A and B from the witness so that the witness is no longer used in connection with deciding a winner among sites A and B, where the winner is the single site that continues servicing I/Os of the metro volume group in the event of a replication failure or fracture with respect to the metro volume group GP1. As a result of removing, disconnecting or disengaging the witness, the metro configuration can now transition from the witness mode to bias mode. In at least one embodiment if there is no witness deployed in connection with the metro configuration of sites A and B, the metro configuration can already be in bias mode. Consistent with other discussion herein, in bias mode, sites A and B can each be configured such that a first of the sites such as site A is designated as the preferred site with the second remaining site such as site B designates as the non-preferred site. Each of the sites can be configured to know its role as well as the role of the other site of the metro configuration. Responsive to a replication link failure or failure of the non-preferred site B, the preferred site A can be the single site which continues to service I/Os directed to the metro volume group GP1 and the stretched LUN A being added.

When in bias mode and responsive to a replication failure or fracture of the metro volume group GP1, the winner or surviving site which continues servicing I/Os of GP1 in the event of replication failure or fracture with respect to GP1 can be predetermined whereby the sites A and B can independently determine which one of the sites is the winner. In at least one embodiment of the bias mode and responsive to a replication failure or fracture with respect to the metro volume group GP1, the particular one of the sites A and B configured as the preferred site can always win and continue servicing I/Os directed to the stretched volumes of the metro volume group GP1. In at least one embodiment with bias mode, only the preferred site can win or survive. If the replication failure or fracture is caused by the preferred site A failing, whereby only the non-preferred site B remains online, the workflow in accordance with the techniques of the present disclosure can stop or fail. For example, non-preferred site B can detect that preferred site A is offline or unavailable whereby the non-preferred site B does not subsequently service I/Os directed to volumes of the metro volume group GP1. Thus with bias mode in at least one embodiment, the winner or remaining site which continues servicing I/Os with respect to members of the metro volume group GP1 can always be the single designated preferred site, such as site A. In at least one embodiment, in a scenario where the preferred site fails or is not online and accessible to the host, an embodiment can declare no winner and thus no surviving site remains to service I/Os directed to the metro volume group GP1.

In at least one embodiment, the step S1 can include ensuring the configuration is in bias mode whereby, responsive to a replication fracture such as due to a failed replication link, the preferred site A can continue to subsequently be the sole site which services I/Os directed to GP1 and LUN A. Site B, if healthy and online, can be configured to not service I/Os directed to LUN A or GP1 until the replication link is functional and the replication is re-established for both LUN A and GP1.

In at least one embodiment, the first workflow can be performed by executed code on the preferred site A.

Following the step S1, a step S2 can be performed. In the step S2, while both the existing metro volume group GP1 and the metro volume or stretched LUN A being added are in the active-active state and synchronously replicating data in both directions as in FIG. 5, processing can delete the replication session object or component associated with the stretched LUN A on both sites A and B but while also retaining the stretched volume or LUN A (as configured from V1 on site A and V2 on site B), any snapshots of the stretched LUN A, and its current replication configuration. Put another way, the replication session component or object for the stretched LUN A can be included in a layered services stack for the stretched LUN A. In at least one embodiment, other workflows which delete the replication session component or object from the layered services stack for a stretched LUN or volume can also include deleting other lower level objects from the stack and also deleting other items associated with the replication session object or component for the stretched LUN. For example, such other items deleted can include the stretched volume or LUN associated with the replication session object or component, the snapshots of the stretched volume or LUN, and also removing the replication configuration for the stretched volume or LUN. However, in connection with the techniques of the present disclosure, the foregoing can be modified so as to only remove or delete the top-level replication session object or component from the existing layered services stack of the data path for the stretched LUN A. As a result, the lower levels (e.g., layers, components or objects) of the existing layered services stack for stretched LUN A can be retained thereby also retaining their associated storage resources and entities including retaining the stretched LUN A (e.g., retaining both V1 of site A and V2 of site B configured as LUN A, along with retaining the content stored thereon), stretched LUN A's replication ongoing and established synchronous configuration (e.g., components or objects of the data path layered services stack which are established to perform processing for the bi-directional synchronous replication), and any existing snapshots of the stretched LUN A (as on both sites A and B). Processing of the step S2 can include removing or deleting the top level replication session object or component of the layered services stack associated with the stretched LUN A but retaining other existing lower levels of the layered services stack for the stretched LUN A. In at least one embodiment, the replication session object or component for the stretched LUN A can be a general session object or component with an associated type of metro to denote the particular replication type of bi-directional synchronous replication.

The step S2 can also include updating the MGT DBs 2552a-b, respectively, of sites A and B, to no longer identify the stretched LUN A as an independent metro volume.

As a result of performing S2, the established bi-directional synchronous replication of the stretched LUN A continues, and both sites A and B in the active-active arrangement continue to service received I/Os directed to LUN A. Thus there is no disruption to the host in connection with servicing I/Os directed to LUN A where such I/Os to LUN A can be sent over both the active path 2108a to site A and the active path 2504 to site B. Following the step S2, a step S3 can be performed.

In the step S3, the stretched volume or LUN A can be added to the existing metro volume group GP1. In at least one embodiment, GP1 can also have its own associated layered services stack with its own top level replication session object or component instance of type metro. The step S3 can include associating GP1's replication session object or component with the remaining retained lower layers of the layered services stack for the stretched LUN A. Put another way, RS can denote the remaining layers, components or objects of the layered services stack of the stretched LUN A after completion of step S2 (where the top level replication session object for LUN A is removed or deleted while retaining remaining lower levels RS of the layered services stack of stretched LUN A). The step S3 can include linking or associating a first replication session object or component of GP1's layered services stack with RS whereby the first replication session object of GP1 now includes or is associated with RS (remaining stack layers for stretched LUN A).

Consistent with discussion herein, at this point in the first workflow after completion of the step S3, the stretched volume or LUN A is now added to GP1. As noted above, the synchronous replication for the members of GP1 as well as the stretched LUN A added to GP1 continues and is not paused or stopped during the steps S1, S2 and S3. As a result, no synchronization of content is needed between the any pair of volumes (e.g., V1 of site A and V2 of site B) configured as a stretched resource of GP1; and no synchronization of content is needed between the volumes (e.g., V1 of site A and V2 of site B) configured as the stretched LUN A added to GP1.

Figure 6:
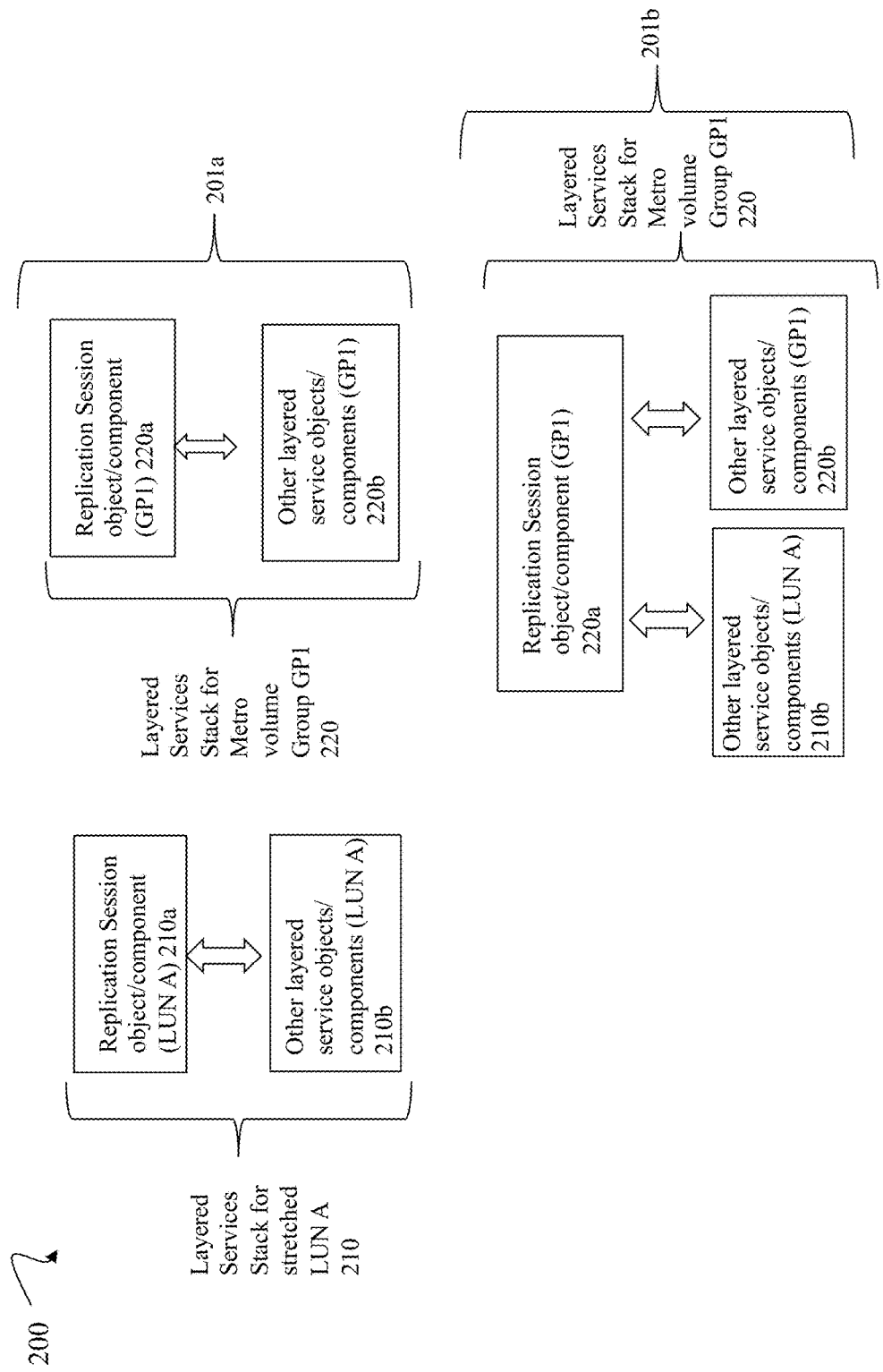
FIGS. 6, 7 and 10 are examples of layered services stacks of objects that can be used in at least one embodiment in accordance with the techniques of the present disclosure.

Reference is now made to FIG. 6 illustrating an example 200 providing more detail regarding the layered services stacks of the data path or I/O path in at least one embodiment in accordance with the techniques of the present disclosure.

The example 200 illustrates in more detail the results of the layered services stack objects or components in connection with performing the steps S2 and S3 of the first workflow to add the stretched LUN A to GP1.

The element 201a illustrates the layered services stacks for the stretched LUN A 210 and the metro volume group GP1 220 prior to performing the step S2. The layered services stack for stretched LUN A 210 illustrates the runtime stack of objects, components, or more generally, code entities in connection with the established synchronous replication configuration and components for the stretched LUN A. The stack 210 can include a top or uppermost level object or component, the replication session object or component for LUNA 210a. The object 210a can be of type metro and can communicate with one or more other objects or components of the layered services stack for stretched LUN A, where such one or more other objects or components are denoted by element 210b. Thus element 210b can generally denote one or more lower level objects or components included, along with the replication session object 210a, in the stretched LUN A's layered services stack 210.

Also included in 201a is the layered services stack for the metro volume group GP1 220. The element 220 illustrates the runtime stack of objects, components, or more generally, code entities in connection with the established synchronous replication configuration and components for GP1 prior to performing the step S2. The stack 220 can include a top or uppermost level object or component, the replication session object or component for GP1 220a. The object 220a can be of type metro and can communicate with one or more other objects or components of the layered services stack for GP1, where such one or more other objects or components are denoted by element 220b. Thus element 220b can generally denote one or more lower level objects or components included, along with the replication session object 220a, in GP1's layered services stack 210.

As discussed above and elsewhere herein, the step S2 can include deleting or removing the top level replication session object 210a from the layered services stack 210 of the stretched LUN A. Thus, the step S2 includes removing object 210a from the stretched LUN A's associated stack 210 whereby after step S2, the stack 210 can include only the retained remaining objects denoted by 210b. Subsequently as illustrated by the element 201b, the step S3 includes associating the retained remaining objects 210b for stretched LUN A with the replication session object 220a of GP1. Thus element 201b illustrates the layered services stack of GP1 220 after performing the step S3.

The example 200 can illustrate the layered services stacks of the stretched LUN A and the group GP1 on a single one of the storage systems or sites where each of the sites A and B can include runtime stacks of objects or components as illustrated in FIG. 6.

In at least one embodiment, the step S3 can also include updating data structures defining the metro volume group GP1 2551 in the management database (MGT DB) 2552a of site A 2102 and updating data structures defining the metro volume group GP1 2551 in the MGT DB 2552b of site B 2104. The step S3 can include, for example, updating MGT DB 2552a of site A 2102 to include the stretched LUN A in the metro volume group membership of GP1 2551; and updating data structures defining the metro volume group GP1 2551 in the MGT DB 2552b of site B 2104 to include the stretched LUN A in the metro volume group membership of GP1 2551.

After completing the step S3 but before proceeding to the next step S4 discussed below, any metro volume group GP1 snapshots (taken prior to this point) do not include the newly added stretched LUN or volume A.

Following the step S3, the step S4 can be performed. In the step S4, once the stretched LUN or volume A is added into the metro volume group GP1, new recovery snapshots for GP1 can be taken on both sites A and B. Such recovery snapshots of GP1 can be used as may be needed for recovery purposes since such snapshots with respect to GP1 membership can denote a crash consistent copy of all members of GP1 (including the newly added stretched LUN A) on both the site A and site B.

The step S4 can include creating or taking a first recovery snapshot of GP1 on site A and creating or taking a second recovery snapshot of GP1 on site B. Creating the first recovery snapshot of GP1 on site A can include taking write-consistent snapshots across all local V1 volumes of GP1 on site A. Creating the second recovery snapshot of GP1 on site B can include taking write-consistent snapshots across all local V2 volumes of GP1 on site B. In at least one embodiment, the recovery snapshots of GP1 on both sites A and B can be identical. In at least one embodiment, taking a snapshot of GP1 on a site includes taking snapshots of all members of GP1, including the newly added stretched LUN A, where such snapshots are write consistent and thus where all such snapshots of members of GP1 denote a crash consistent copy of GP1. Thus a crash-consistent snapshot of GP1 on a site, such as site A, takes a snapshot of members (e.g., local V1s) of GP1 while preserving the write order of writes made to such members of GP1. In the event of a subsequent crash or failure of one of the sites A or B, the surviving functional site can continue to service I/Os directed to members of the metro volume group GP1. Subsequently, when the failed site recovers, the recovery snapshots of GP1 can be leveraged to resynchronize the copy of the metro volume group GP1 of the recovered site.

To further illustrate use of recovery snapshots, one resynchronization technique uses recovery snapshots or snaps on sites A and B. A snapshot or snap of a storage object or resource generally refers to a point-in-time (PIT) replication of data of a storage resource (e.g., a LUN or volume, a file system), along with its associated snapshot metadata. Such a snapshot can be a full replica (or copy) of the data stored on the storage resource, a partial copy of the data stored on the storage resource, or a space-efficient copy that includes differences between a current version of the data stored on the storage resource at one PIT and an earlier version of the data stored on the storage resource at a prior PIT. Processing can include creating recovery snapshots of the metro volume group GP1 such as, for example, periodically or otherwise in a coordinated manner on the two sites A and B. The recovery snapshots can be leveraged to determine the write requests that might not have been replicated at the time of any fault in the sites A and B, or in the network link therebetween. For example, assuming site B was unavailable and site A continued to service storage clients using its V1 copies of the stretched volumes of GP1, a snapshot difference between two successive snapshots of a stretched volume V1 of site A can be used to synchronize the missing writes on site B which was unavailable or offline due to a fault causing the replication failure.

Following the step S4, a step S5 can be performed. In the step S5, processing can be performed to re-engage the witness, if any. Such re-engaging of the witness can include enabling or establishing communications between the sites A and B, and transitioning from bias mode back to witness mode.

Upon successful completion of the foregoing steps S1-S5, the newly added stretched LUN A of GP1 can be enumerated as a metro volume group member of GP1, for example, in connection with different interfaces, operations and requests for information regarding GP1. In at least one embodiment, LUN A can be listed as an existing metro volume group member of GP1 in connection with one or more GUIs (graphical user interfaces), APIs (application programming interfaces) and/or CLIs (command line interfaces). For example, a user can make a selection using a GUI of a management application to list members of GP1 on a display; an API call can be made from executing code to return a list of members of GP1; and/or a CLI call can be made such as from an executed script to return a list of members of GP1. Each of the foregoing GUI, API or CLIs can result in a call being made to return information, such as from one of the MGT DBs 2552*a-b*, which identifies all existing members of GP1. Accordingly, after completion of the above-noted first workflow to add LUN A, such members of GP1 also include LUN A whereby LUN A is returned in response to a corresponding GUI request, API call and/or CLI call.

What will now be described is a second workflow of processing steps that can be performed in at least one embodiment in accordance with the techniques of the present disclosure to remove an existing metro or stretched volume, such as LUN or volume A discussed above as in connection with FIG. 5, from the existing metro volume group GP1. In at least one embodiment, GP1 can include one or more members, in addition to LUN A, each of which can be a stretched volume or LUN configured for replication such as bi-directional synchronous replication.

In a first step S11, in the event of a replication failure during the second workflow to remove LUN or volume A from GP1, processing can be performed to ensure that both the stretched LUN or volume A and GP1 are exposed and available for the I/O to the host from the same site or system, such as site A 2102. The foregoing can be accomplished in any suitable manner depending on the particular configuration and embodiment. Generally, the step S11 is similar to the step S1 of the first workflow described above to add a member to GP1.

In particular, if the replication failure is due to failure of the replication link between sites A and B, both sites A and B can be healthy and able to remain online and service I/Os directed to both LUN A and GP1. However, due to the link failure, polarization or other logic can be configured to select only one of the sites A and B as the winner or sole surviving site which is to subsequently remain online servicing I/Os to both LUN A and GP1.

In some embodiments as discussed herein, a witness can be used in connection with implementations to decide a winner denoting which of the systems or sites A and B continues servicing I/Os directed to the metro volume group if there is a replication failure or fracture with respect to the metro volume group GP1. In such an embodiment in which a witness is deployed such that the replication configuration is operating in a witness mode, the step S11 can include removing, disconnecting or disengaging the sites A and B from the witness so that the witness is no longer used in connection with deciding a winner among sites A and B, where the winner is the single site that continues servicing I/Os of the metro volume group in the event of a replication failure or fracture with respect to the metro volume group GP1. As a result of removing, disconnecting or disengaging the witness, the metro configuration can now transition from the witness mode to bias mode. In at least one embodiment if there is no witness deployed in connection with the metro configuration of sites A and B, the metro configuration can already be in bias mode. Consistent with other discussion herein, in bias mode, sites A and B can each be configured such that a first of the sites such as site A is designated as the preferred site with the second remaining site such as site B designates as the non-preferred site. Each of the sites can be configured to know its role as well as the role of the other site of the metro configuration. Responsive to a replication link failure or failure of the non-preferred site B, the preferred site A can be the single site which continues to service I/Os directed to the metro volume group GP1 and the stretched LUN A being added.

When in bias mode and responsive to a replication failure or fracture of the metro volume group GP1, the winner or surviving site which continues servicing I/Os of GP1 in the event of replication failure or fracture with respect to GP1 can be predetermined whereby the sites A and B can independently determine which one of the sites is the winner. In at least one embodiment of the bias mode and responsive to a replication failure or fracture with respect to the metro volume group GP1, the particular one of the sites A and B configured as the preferred site can always win and continue servicing I/Os directed to the stretched volumes of the metro volume group GP1. In at least one embodiment with bias mode, only the preferred site can win or survive. If the replication failure or fracture is caused by the preferred site A failing, whereby only the non-preferred site B remains online, the workflow in accordance with the techniques of the present disclosure can stop or fail. For example, non-preferred site B can detect that preferred site A is offline or unavailable whereby the non-preferred site B does not subsequently service I/Os directed to volumes of the metro volume group GP1. Thus with bias mode in at least one embodiment, the winner or remaining site which continues servicing I/Os with respect to members of the metro volume group GP1 can always be the single designated preferred site, such as site A. In at least one embodiment, in a scenario where the preferred site fails or is not online and accessible to the host, an embodiment can declare no winner and thus no surviving site remains to service I/Os directed to the metro volume group GP1.

In at least one embodiment, the step S11 can include ensuring the configuration is in bias mode whereby, responsive to a replication fracture such as due to a failed replication link, the preferred site A can continue to subsequently be the sole site which services I/Os directed to GP1 and LUN A. Site B, if healthy and online, can be configured to not service I/Os directed to LUN A or GP1 until the replication link is functional and the replication is re-established for both LUN A and GP1.

In at least one embodiment, the second workflow can be performed by executed code on the preferred site A.

Following the step S11, a step S12 can be performed.

Figure 7:
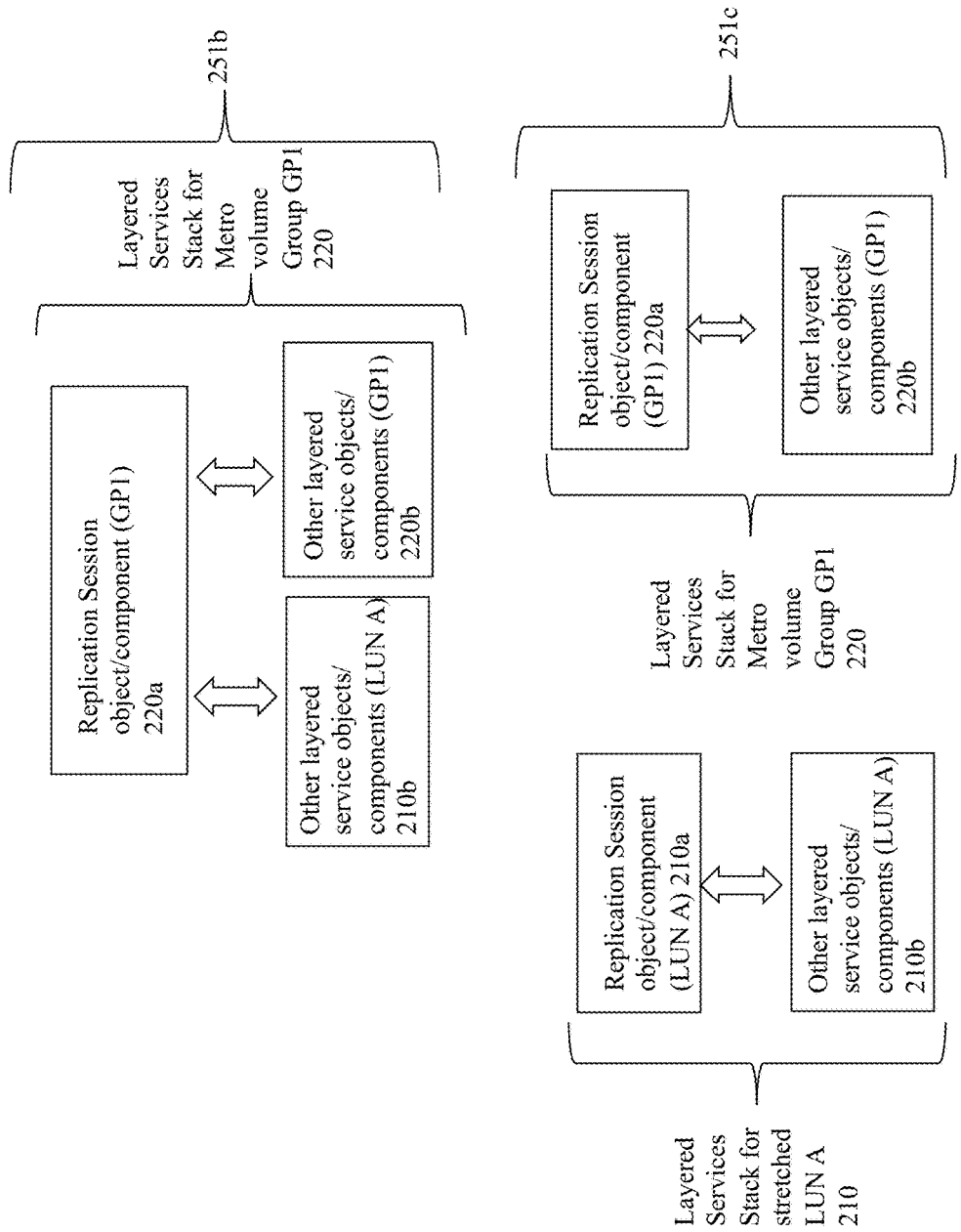

To further illustrate the state of components or objects with respect to GP1 and the stretched LUN A prior to performing the step S12 discussed below, reference is made to the example 250 of FIG. 7. In FIG. 7, element 251*b* includes the same components as element 201*b* of FIG. 6.

As discussed above, elements 201*b* and thus 251*b* can generally represent the layered services stack of GP1 including stretched LUN A as a member of GP1. Thus, element 251*b* also represents the state of the stack 220 of GP1 prior to performing the step S12. As discussed below in more detail, the second workflow includes subsequent steps which place the stacks 210 and 220 in a state as represented by the element 251*c* (which also corresponds to the state of components as denoted by element 251*a* of FIG. 6).

In the step S12, processing can be performed to create a new replication session object or component, of type metro for stretched LUN A on both the sites A and B. With reference to FIG. 7, processing of the step S12 can include creating the replication session object 210*a* for the stretched LUN A which will be used in establishing stretched LUN A as a separate and independent metro volume. In at least one embodiment, the replication session object or component for the stretched LUN A can be a general session object or component with an associated type of metro to denote the particular replication type of bi-directional synchronous replication. Following the step S12 is a step S13.

In the step S13, while all members (include the stretched LUN A) of the existing metro volume group GP1 are in the active-active state and synchronously replicating data in both directions as in FIG. 5, processing can include moving the stretched LUN A out of GP1 while retaining its associated layered stack objects 210b and while also retaining its associated storage resources and its current replication configuration. The foregoing can be performed on both sites A and B. The items including associated storage resources retained for stretched LUN A can include the stretched volume or LUN A (as configured from V1 on site A and V2 on site B), any snapshots of the stretched LUN A, and its current replication configuration. In connection with the techniques of the present disclosure, the stretched LUN can be removed or moved out of GP1 while retaining the lower levels 210b (e.g., layers, components or objects) of the existing layered services stack for stretched LUN A and thereby also retaining their associated storage resources and entities including retaining the stretched LUN A (e.g., retaining both V1 of site A and V2 of site B configured as LUN A, along with retaining the content stored thereon), stretched LUN A's replication ongoing and established synchronous configuration (e.g., components or objects of the data path layered services stack which are established to perform processing for the bi-directional synchronous replication), and any existing snapshots of the stretched LUN A (as on both sites A and B).

Processing of the step S13 can include removing or deleting the stretched LUN A from GP1 by unlinking or disassociating stretched LUN A's layered service stack objects 210b from GP1's replication session object 220a, and also retaining the existing lower levels 210b of the layered services stack for the stretched LUN A.

As a result of performing S13, the established bi-directional synchronous replication of the stretched LUN A continues, and both sites A and B in the active-active arrangement continue to service received I/Os directed to LUN A as well as other members of GP1. Thus there is no disruption to the host in connection with servicing I/Os directed to LUN A or other remaining members of GP1 where such I/Os can be sent over both the active path 2108a to site A and the active path 2504 to site B.

The step S13 can also include updating the MGT DBs 2552a-b, respectively, of sites A and B, to remove LUN A from GP1. Following the step S13, a step S14 can be performed.

In the step S14, the stretched volume or LUN A can be added to the existing metro volume group GP1. The step S14 can include associating stretched LUN A and its layered services stack objects or components 210b with the newly created replication session object 210a (created in the prior step S12).

In at least one embodiment, the stretched LUN A can also have its own associated layered services stack components 210b. The step S14 can include linking or associating LUN A's replication session object or component 210a with 210b (denoting the remaining retained lower layers of the layered services stack for the stretched LUN A).

With reference to FIG. 7, element 251c can denote the layered services stack for stretched LUN A 210 and the layered services stack for GP1 220 after performing the processing of the step S14 in at least one embodiment in accordance with the techniques of the present disclosure. Generally, element 251c of FIG. 7 corresponds to element 201a of FIG. 6.

As discussed above and elsewhere herein, processing of the second workflow can include creating the top level replication session object 210a for the stretched LUN A (step S12); moving or removing the stretched LUN A out of GP1 while retaining its associated configuration and storage resources (step S13) (e.g., retaining items including layered services stack components 210b, V1 and V2 configured as LUN A; and any snapshots of LUN A on sites A and B); and associating or linking (S14) the stretched LUN A and its layered service object 210b with its new top level replication session object 210a.

In at least one embodiment, the step S14 can also include updating data structures of the MGT DBs 2552a-b to identify the stretched LUN A as an independent stretched LUN or metro volume.

Consistent with discussion herein, at this point in the second workflow after completion of the step S14, the stretched volume or LUN A has been removed from GP1 and now operates and is configured as an independent standalone storage object separate from GP1. As noted above, the synchronous replication for the members of GP1 as well as the stretched LUN A continues and is not paused or stopped during the steps S11, S12, S13 and S14. As a result, no synchronization of content is needed between the any pair of volumes (e.g., V1 of site A and V2 of site B) configured as a stretched resource of GP1; and no synchronization of content is needed between the volumes (e.g., V1 of site A and V2 of site B) configured as the stretched LUN A removed from GP1.

After completing the step S14 but before proceeding to the next step S15 discussed below, any metro volume group GP1 snapshots (taken prior to this point) include the stretched LUN or volume A; and there may be no separate independently created snapshots of the stretched LUN A (e.g., no snapshots of stretched LUN A besides those obtained as part of group level snapshots taken of GP1).

In the step S15, new recovery snapshots for GP1 and the now independent (e.g., independent of GP1) stretched LUN A can be taken on both sites A and B. Such recovery snapshots of GP1 can be used as may be needed for recovery purposes as discussed elsewhere herein.

The step S15 can include creating or taking a first recovery snapshot of GP1 on site A and creating or taking a second recovery snapshot of GP1 on site B. The step S15 can include creating or taking a first recovery snapshot of stretched LUN on site A and creating or taking a second recovery snapshot of stretched LUN A on site B. The snapshots of stretched LUN A can be taken independently and without any coordination with taking snapshots of GP1.

Following the step S15, a step S16 can be performed. In the step S16, processing can be performed to re-engage the witness, if any. Such re-engaging of the witness can include enabling or establishing communications between the sites A and B, and transitioning from bias mode back to witness mode.

Upon successful completion of the foregoing steps S11-S16, the revised definition and membership of GP1 can be enumerated, such as in response to relevant queries and requests, without listing stretched LUN A as a member of GP1. In a similar manner, for various relevant queries and requests, for example, listing configured LUNs or stretched LUNs, the stretched LUN A can be identified as a separate storage resource independently of GP1. Consistent with discussion above in connection with the first workflow, such queries and requests can be made in connection with GUIs, APIs and/or CLIs in at least one embodiment in accordance with the techniques of the present disclosure.

The foregoing first and second workflows discussed above provide for configuring metro or stretched objects, such as a stretched LUN A, and using the techniques of the present disclosure to move existing metro objects in and out of metro groups while also retaining such objects as metro or stretched objects.

Figure 8B:
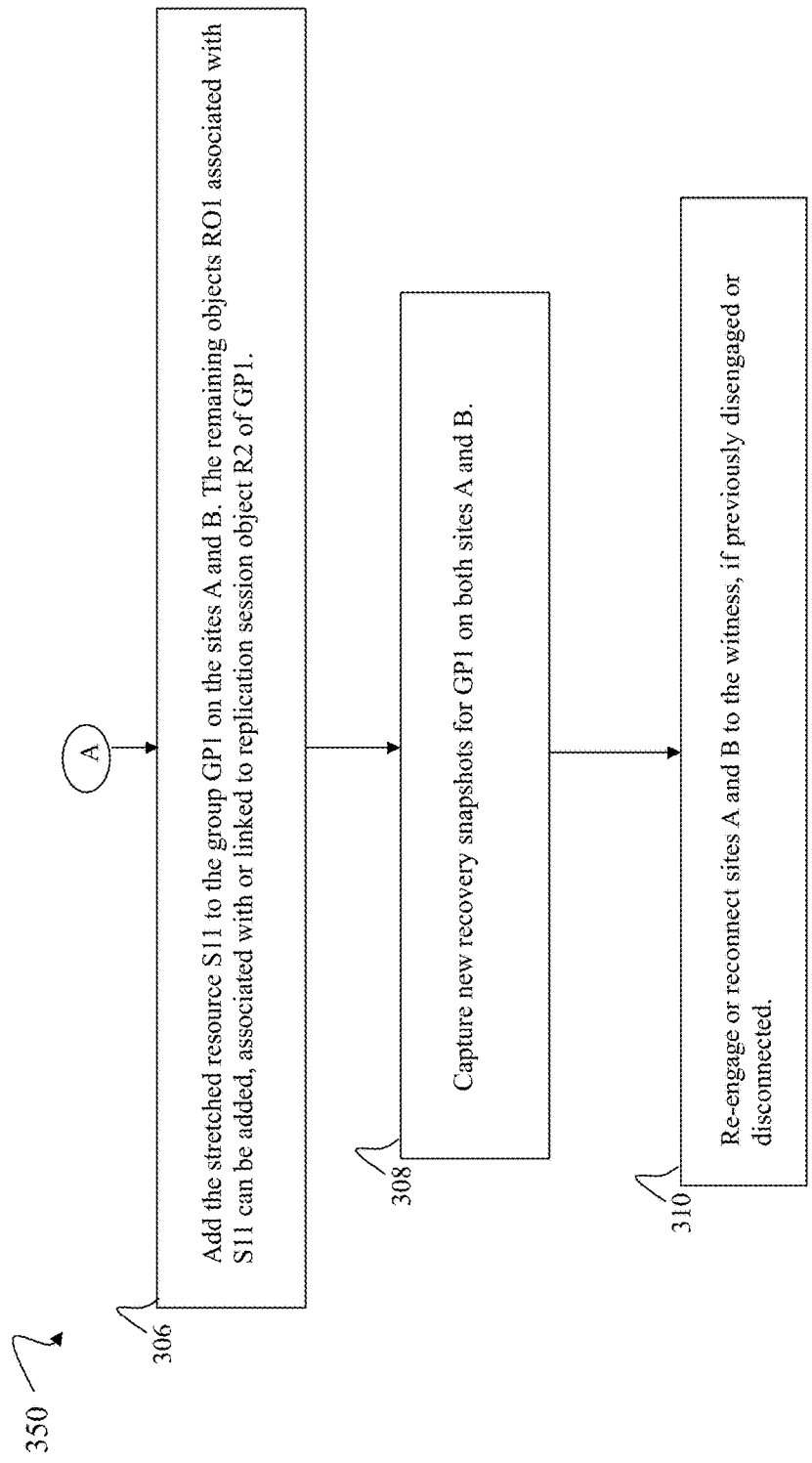

What will now be described are flowcharts of processing steps summarizing the above-noted first and second workflows to, respectively, add and remove a stretched or metro storage object or resource from a group in at least one embodiment in accordance with the techniques of the present disclosure Referring to FIGS. 8A and 8B shown is a flowchart 300, 350 of processing steps summarizing the first workflow to add a stretched storage resource or object to an existing group in at least one embodiment in accordance with the techniques of the present disclosure.

At the step 302, the metro replication configuration with respect to the group GP1 of stretched resources and the stretched resource or object SS1 being added transitions into bias mode. The sites A and B of the metro replication configuration may already be in bias mode or may transition from a witness mode to bias mode. When in the witness mode, a third system or site C can serve as a witness which is in communication with the sites A and B, where the witness can facilitate selection of a single one of the sites A and B which continues servicing I/Os directed to the group members and stretched resource being added responsive to a replication failure or fracture with respect to the group.

Transitioning from witness mode to bias mode can include disengaging the witness from its witness role in connection with selecting the foregoing single site responsive to a replication failure or fracture with respect to the group or stretched resource being added.

When in bias mode, only the preferred site can win or be selected as the single site which continues servicing I/Os directed to the group members of GP1 and stretched resource SS1 being added, responsive to a replication failure or fracture with respect to GP1 and SS1. Responsive to the foregoing replication failure or fracture, both the group GP1 and the stretched resource SS1 being added need to stay online and available for I/Os through the same site in scenarios where both sites A and B can still be capable of surviving and servicing I/Os (e.g., as can be the case where the replication failure or fracture is due to failure of the replication link between sites A and B). From the step 302, control proceeds to the step 304.

At the step 304, while both the existing group GP1 and the stretched object SS1 being added are in an active-active state with established bi-directional synchronous replication (e.g., written or updated content directed to members of GP1 and written or updated content directed to SS1 being received at sites A and B and actively replicated between sites A and B), the replication session object R1 that is associated with the stretched object SS1 being added is deleted on both sites A and B. R1 can be included in a first layered services stack Q1 of the stretched resource SS1 being added. The remaining objects RO1 of Q1 can be retained. The stretched resource is retained (e.g., both V1 of site A and V2 of site B are retained along with any existing content thereon); the existing replication configuration for SS1 remains established and is retained; and any existing snapshots of SS1 on sites A and B are retained. From the step 304, control proceeds to the step 306.

At the step 306, the stretched resource SS1 is added to the group GP1 on the sites A and B. The remaining objects RO1 associated with SS1 can be added, associated with or linked to replication session object R2 of GP1. R2 is a replication session object of GP1 where R2 is included in a second layered services stack Q2 of objects associated with GP1. Thus associating RO1 with R2 of GP1 results in linking or associating RO1 (corresponding to the added resource SS1) with the layered services stack Q2 of GP1, thereby adding RO1 to the second layered services stack Q2 corresponding to GP1. From the step 306, control proceeds to the step 308.

At the step 308, new recovery snapshots for GP1, which now includes SS1 as a member, can be captured on both sites A and B. From the step 308, control proceeds to the step 310.

At the step 310, processing can be performed to re-engage or reconnect sites A and B to the witness, if previously disengaged or disconnected in the step 302.

Although not explicitly mentioned in the flowchart of FIGS. 8A and 8B, processing can also include performing any needed updates to the MGT DBs 2552a-b of sites A and B consistent with other discussion herein.

Figure 9B:
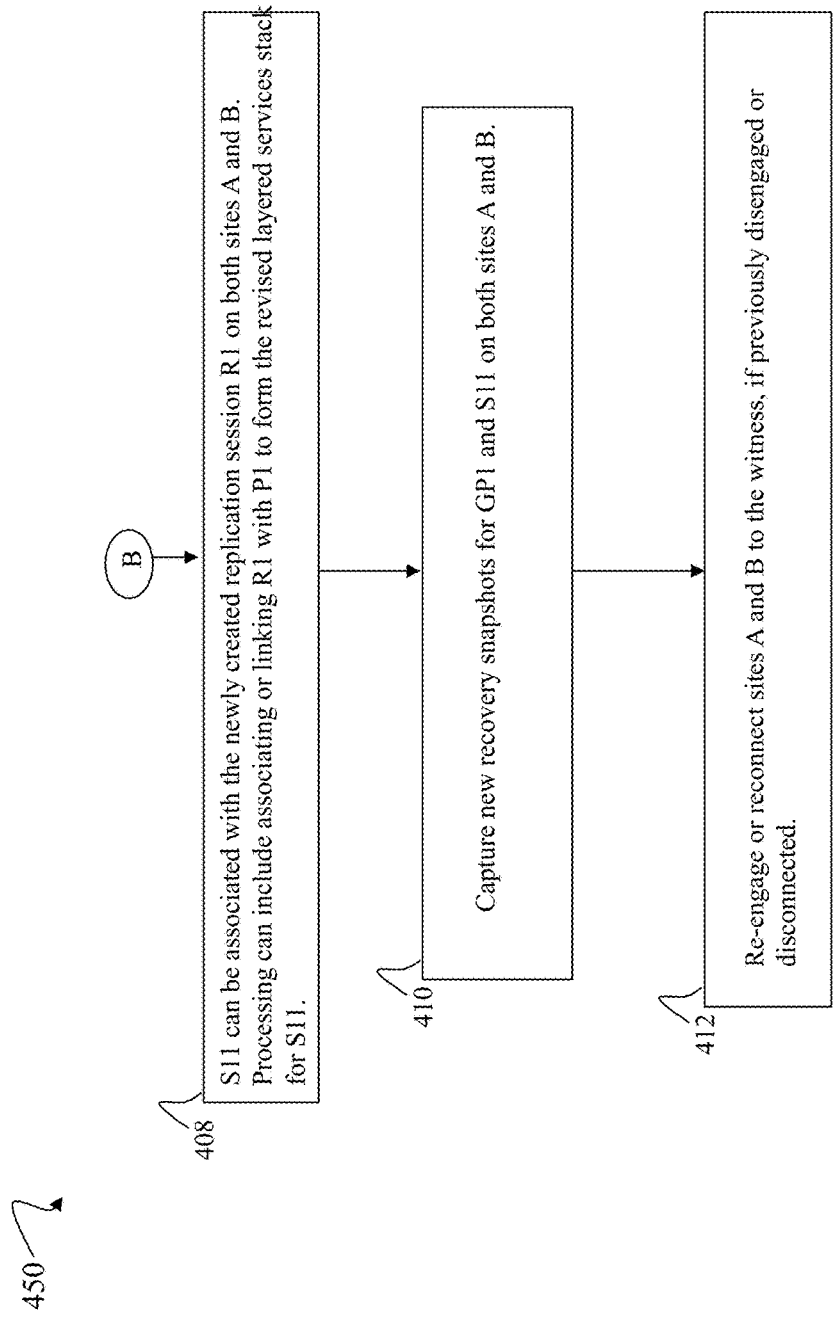

Referring to FIGS. 9A and 9B shown is a flowchart 400, 450 of processing steps summarizing the second workflow to remove a stretched storage resource or object from an existing group in at least one embodiment in accordance with the techniques of the present disclosure.

At the step 402, the metro replication configuration with respect to the group GP1 of stretched resources and the stretched resource or object SS1 being removed from GP1 transitions into bias mode. The sites A and B of the metro replication configuration may already be in bias mode or may transition from a witness mode to bias mode. When in the witness mode, a third system or site C can serve as a witness which is in communication with the sites A and B, where the witness can facilitate selection of a single one of the sites A and B which continues servicing I/Os directed to the group members of GP1 and stretched resource SS1 being removed responsive to a replication failure or fracture with respect to GP1 or SS1.

Transitioning from witness mode to bias mode can include disengaging the witness from its witness role in connection with selecting the foregoing single site responsive to a replication failure or fracture with respect to GP1 or SS1.

When in bias mode, only the preferred site can win or be selected as the single site which continues servicing I/Os directed to the group members of GP1 and stretched resource SS1, responsive to a replication failure or fracture with respect to GP1 and SS1. Responsive to the foregoing replication failure or fracture, both the group GP1 and the stretched resource SS1 need to stay online and available for I/Os through the same site in scenarios where both sites A and B can still be capable of surviving and servicing I/Os (e.g., as can be the case where the replication failure or fracture is due to failure of the replication link between sites A and B). From the step 402, control proceeds to the step 404.

At the step 404, a new replication session object R1 is created for SS1 on both sites A and B. From the step 404, control proceeds to the step 406.

At the step 406, while all members (including SS1) of GP1 are in an active-active state with established bi-directional synchronous replication, SS1 is moved out or removed from GP1 while retaining the layered services stack portion P1 associated with SS1. P1 can be included in a layered services stack Q2 associated with GP1. Thus P1 can be disassociated with, or unlinked from, Q2. The stretched resource SS1 is retained (e.g., both V1 of site A and V2 of site B are retained along with any existing content thereon); the existing replication configuration for SS1 remains established and is retained; and any existing snapshots of SS1 on sites A and B are retained. From the step 406, control proceeds to the step 408.

At the step 408, SS1 can be associated with the newly created replication session R1 on both sites A and B. Processing can include associating or linking R1 with P1 to form the revised layered services stack for SS1. Thus, the step 408 adds the newly created replication session object R1 as a new top layer to the revised services layer stack for SS1. From the step 408, control proceeds to the step 410.

At the step 410, new recovery snapshot for SS1 and GP1 can be captured on both sites A and B. From the step 410, control proceeds to the step 412.

At the step 412, processing can be performed to re-engage or reconnect sites A and B to the witness, if previously disengaged or disconnected in the step 402.

Although not explicitly mentioned in the flowchart of FIGS. 9A and 9B, processing can also include performing any needed updates to the MGT DBs 2552a-b of sites A and B consistent with other discussion herein.

What will now be described is additional detail in connection with the processing steps of the first workflow to add a stretched volume or LUN A to an existing metro volume group GP1 in at least one embodiment in accordance with the techniques of the present disclosure.

Figure 10:
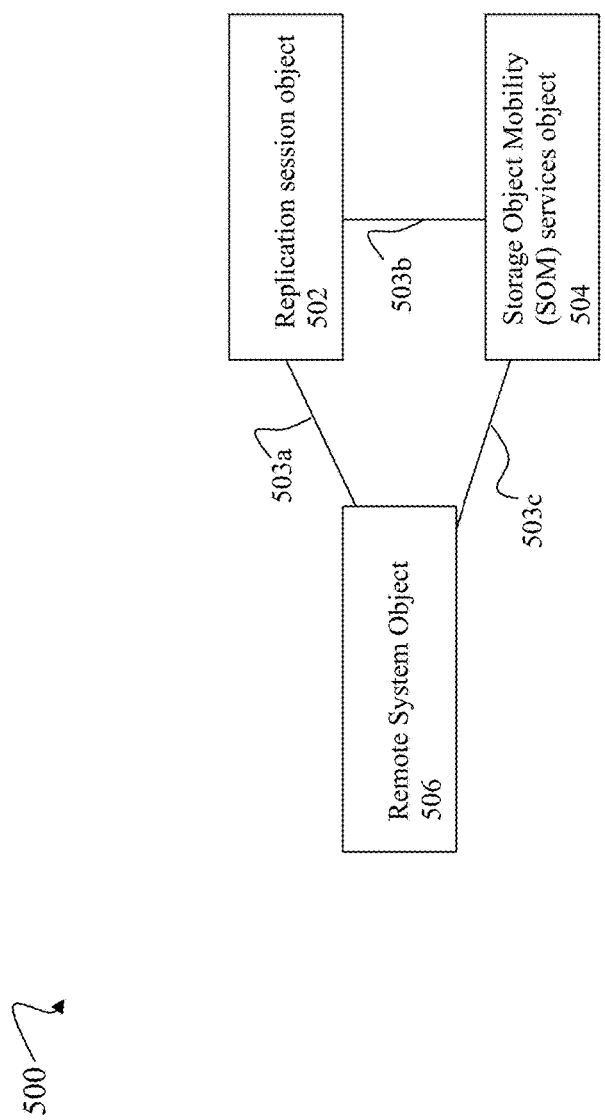

Referring to FIG. 10, shown is an example 500 of objects or components of a replication engine in at least one embodiment in accordance with the techniques of the present disclosure.

The objects or components of 500 can be included in the runtime stacks of the sites A and B consistent with other discussion herein.

The element 502 denotes a remote system object which can be used in connection with services or operations performed with a remote system or site with respect to a local system or system. The remote system object can be configured on the local system or site. The remote system object 502 can set and manage both management and data connections that may be used, respectively, in connection with the control path and data or I/O path.

The element 504 denotes a replication session object which can be characterized as a storage resource level object such as, for example, for an independent or standalone volume or LUN, a volume or resource group such as GP1, and the like. Thus in at least one embodiment, there can be a first replication session object instance for an independent volume or LUN and a second replication session object instance for a metro volume group such as GP1. In at least one embodiment, the replication session object can have an associated type, such as metro, identifying a particular instance of the replication session object which is associated with a metro configuration such as illustrated in connection with FIG. 5.

The element 506 denotes a storage object mobility service or SOM object providing storage element pair level mobility capabilities and APIs such as, for example, for mirroring or copying operations, between pairs of objects. For example, as described in connection with FIG. 5, each metro or stretched volume or LUN can be configured from an identically configured pair of volumes, V1 of site A and V2 of site B. In this manner, the SOM object can correspond to the pair of volumes V1 and V2 where the SOM object can be included in a layered services stack of the data paths on each of the sites A and B.

In at least one embodiment, the SOM 506 can be object type agnostic or generic and can be generally associated with a pair of resource objects of any type. For example, a first SOM object can be associated with a pair of LUNs or volumes as noted above; a second SOM object can be associated with a pair of Vvols or virtual volumes used with virtual machines; and a third SOM object can be associated with a pair of file systems.

In at least one embodiment, an SOM object 506 can interact with other objects of the data path and, in particular, of the layered services stack of the data path. For example, the SOM object in at least one embodiment can interact with other objects which provide for copying or mirroring content.

In at least one embodiment, there can be a one to many relationship as denoted by 503a between the remote system object 502 and the replication session object 504. In particular, there can be multiple replication session objects 504 associated with a single remote system object 502.

In at least one embodiment, there can be a one or many relationship as denoted by 503b between the replication session object 504 and the SOM object 506. In particular, there can be multiple SOM objects 506 associated with a single replication session object 504. In at least one embodiment, a single replication session object 504 can be associated with N SOM instances where N denotes the number of volumes or LUNs in a replicating resource. For example, for a metro volume group such as GP1 where GP1 is the storage resource having the replication session object, the replication session object of GP1 is associated with M SOM instances where M denotes the number of volumes or LUNs in GP1. Thus for GP1, there can be a single corresponding SOM for each member volume or LUN, where the SOM is associated with the replication session object for GP1.

In at least one embodiment, there can be a one to many relationship as denoted by 503c between the remote system object 502 and the SOM object 506. In particular, there can be multiple SOM objects 506 associated with a single remote system object 502.

Figure 11:
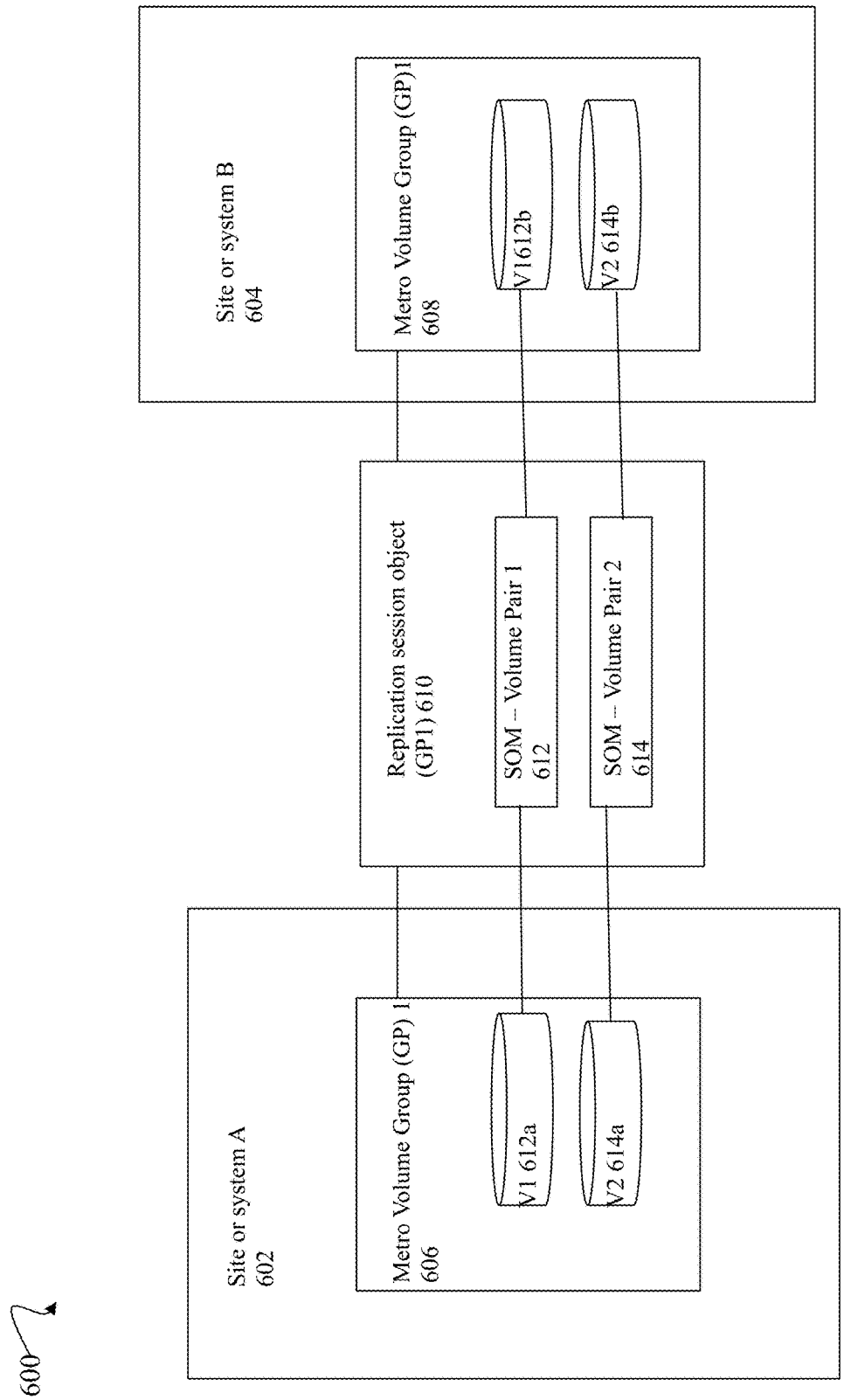
FIGS. 11, 12, 13, 14, 15, 16 and 17 are examples of components and objects that can be used in connection with adding an existing metro volume to an existing metro volume group in at least one embodiment in accordance with the techniques of the present disclosure.

Referring to FIG. 11, shown is an example 600 illustrating associations or correspondences between a replication session object, SOM objects and storage resources in at least one embodiment in accordance with the techniques of the present disclosure.

The example 600 includes site or system A 602 and site or system B 604. Assume that site A 602 is the local system for which the objects 610, 612 and 614 are illustrated. Generally, each of the sites A and B can define its own set of objects 610, 612 and 614 although only a single set is illustrated in FIG. 11 for site A 602.

Assume that there is configured a metro volume group (GP)1 which includes two members, the two stretched or metro volumes configured with the identities V1 and V2. Element 606 can denote the configured local volumes of GP1 on site A 602, and element 608 can denote the configured local volumes of GP1 on site B 604. Consistent with other discussion herein, GP1 can include as members stretched LUN V1 and stretched LUN V2, where the stretched V1 is configured from the volume pair 612a of site A and 612b of site B, and where the stretched LUN V2 is configured from the volume pair 614a of site A and 614b of site B. The volume pair 612a-b for the stretched LUN V1 can be associated with or represented by the SOM volume pair 1 object 612. The volume pair 614a-b for the stretched LUN V2 can be associated with or represented by the SOM volume pair 2 object 614.

As illustrated, the SOMs 612 and 614 can be associated with the replication object 610 for GP1. Thus, replication session object 610 and the SOMs 612 and 614 can be included in the layered services stack of GP1. In particular, the object 610 can be above the SOMS 612 and 614 in the layered services stack of GP1.

What will now be illustrated in following figures are additional details in connection with the first workflow to add an independent existing metro or stretched volume or LUN, V3, to the above-noted group GP1 which includes existing members stretched LUNs V1 and V2 as illustrated and described in connection with FIG. 11.

Figure 12:
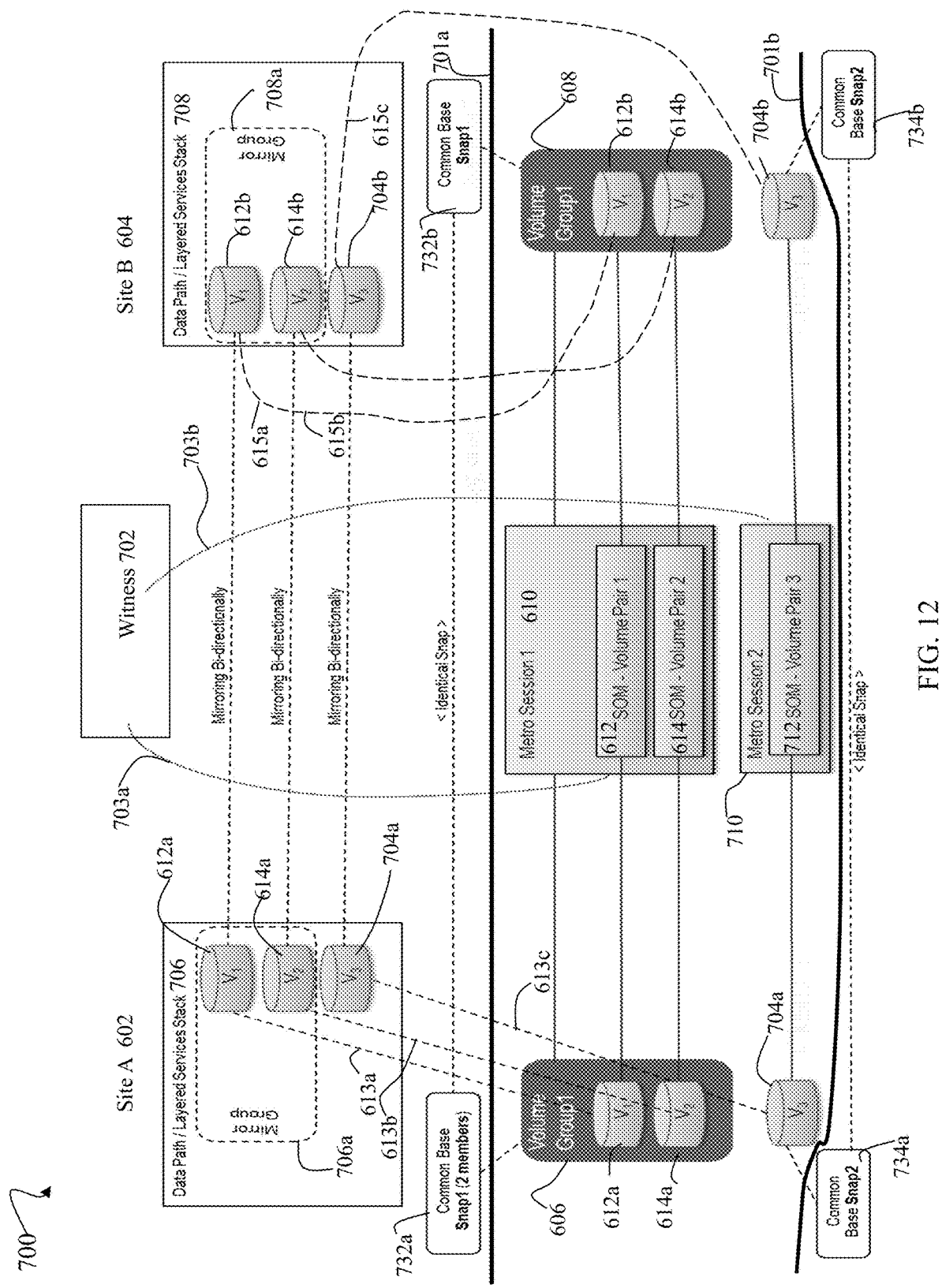

Referring to FIG. 12, shown is an example 700 illustrating components and associated processing in connection with the state of a replication configuration between sites A and B prior to performing the first workflow in at least one embodiment in accordance with the techniques of the present disclosure.

The example 700 includes similarly numbered elements as described in connection with the FIG. 11 along with additional items discussed below. The element 610 denotes the replication session object of type metro which is associated with GP1.

The volume or LUN pair 704a-b can denote the stretched LUN V3 to be added to GP1, where GP1 currently includes as members the stretched LUNs V1 and V2. Element 710 denotes the replication session object of type metro associated with the stretched LUN V3. Element 712 denotes the SOM object associated with the volume or LUN pair 704a-b configured as the stretched LUN V3.

Components and activity or operations above solid line 701a and below solid line 701b may be internal to the storage systems or sites and not exposed to the user. Also, generally, the dashed lines denote activity or operations along with related elements which may not be exposed or visible to the user or host and are rather internal to the systems or sites 602, 604. For example, elements 612a and 614a denote local resources of the volume group 1 (GP1) 606 of site A 602 where 606, 612a and 614a are exposed or visible to the user. Also, element 704a denotes local resource of site A which are exposed or visible to the user.

The dashed lines 613a-c denote relationships between storage resources 612a, 614a and 704a to various elements of the layered services stack of the data path 706 on site A 602, where such relationships are not exposed or visible to the user.

The dashed lines 615a-c denote relationships between storage resources 612b, 614b and 704b to various elements of the layered services stack of the data path 708 on site B 604, where such relationships are not exposed or visible to the user.

Site A 602 includes the layered services stack 706 of the data path which further includes a mirror group 706a configured to perform bi-directional synchronous replication or mirroring with the mirror group 708a of site B 604. The mirror group 706a corresponds to GP1 606 and its members. Also shown in the stack 706 is stretched volume V3 704a configured for bi-directional synchronous replication or mirroring with the paired volume 704b of site B.

Site A 602 includes a snapshot, snap1 732a, of the members (local resources 612a, 614a) of the volume group GP1 606. Site A 602 includes a snapshot, snap2 734a, of the stretched volume V3 704a.

Site B 604 includes the layered services stack 708 of the data path which further includes a mirror group 708a configured to perform bi-directional synchronous replication or mirroring with the mirror group 706a of site A 602. The mirror group 708a corresponds to GP1 608 and its members. Also shown in the stack 708 is stretched volume V3 704b configured for bi-directional synchronous replication or mirroring with the paired volume 704a of site A.

Site B 604 includes a snapshot, snap1 732b, of the members (local resources 612b, 614b) of the volume group GP1 608. Site B 604 includes a snapshot, snap2 734b, of the stretched volume V3 704b.

The snapshots 732a and 734a can be internal recovery snapshots of site A. The snapshots 732b and 734b can be internal recovery snapshots of site B.

As denoted by the dashed lines, the bi-directional synchronous replication can be performed and controlled by the layered services stacks 706, 708 of the data paths of sites A and B for the volume group GP1 606, 608 and stretched LUN V3 704a-b in a manner that is transparent to the host and external user. Additionally, recovery snapshots 732a-b and 734a-b can also be taken and used internally by the sites A and B, as may be needed, in the event of a failure and subsequent recovery of one of the sites.

Also shown in FIG. 12 is witness 702 which can be engaged with sites A and B to decide the winner or sole surviving site which continues to service I/Os directed to V1, V2 and V3 should there be a replication failure or fracture as discussed elsewhere herein. Elements 703a-b can denote the communication connections between the witness 702 and sites A and B.

Figure 13:
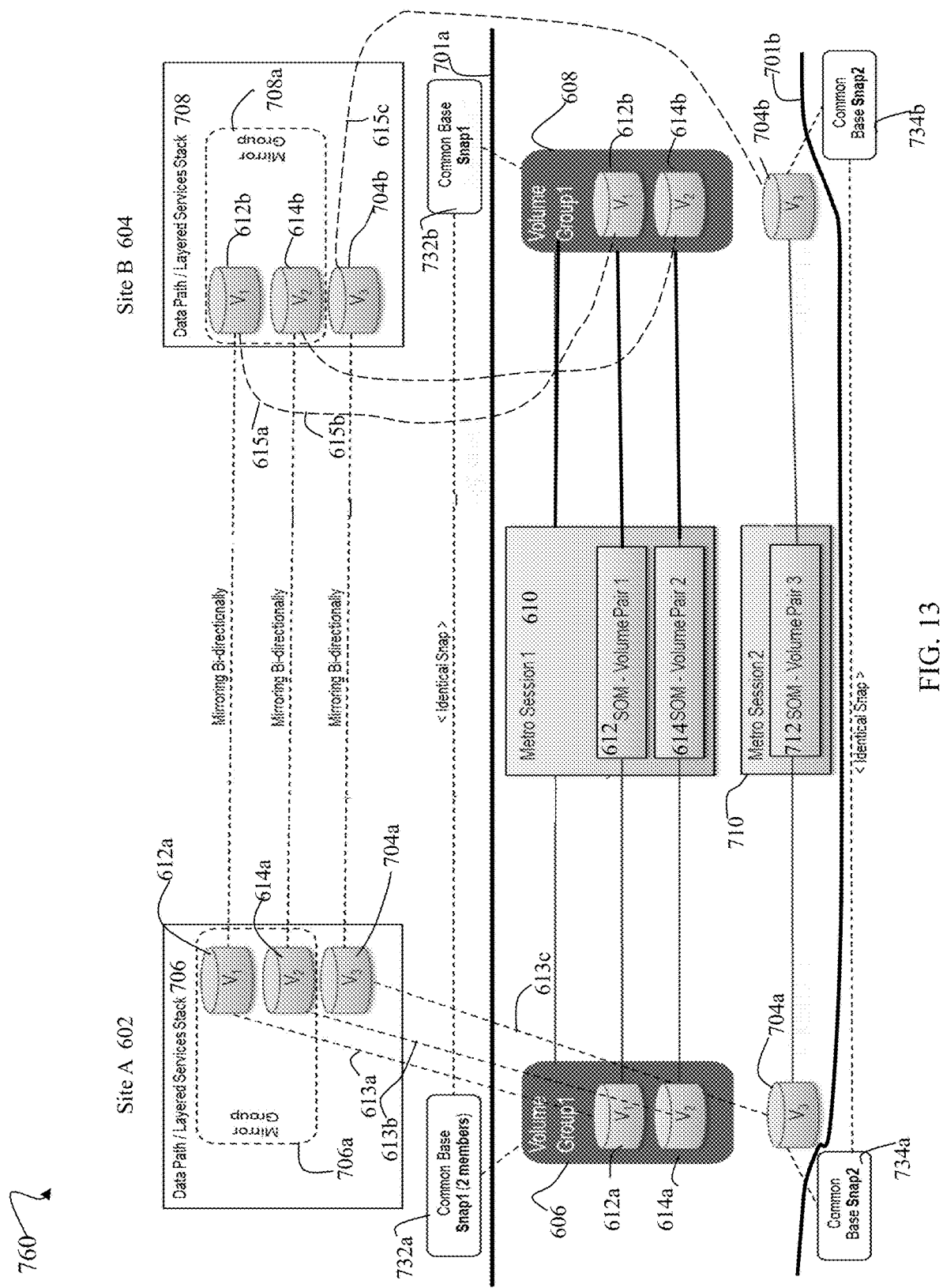

As described in connection with the step S1 and 302 of FIG. 8A, the witness 702 can be disconnected or disengaged as illustrated in FIG. 13 where the elements 703a-b and the witness are eliminated. Thus the example 760 of FIG. 13 can denote the state of the components after completing the step S1, or its corresponding step 302 of FIG. 8A.

Figure 14:
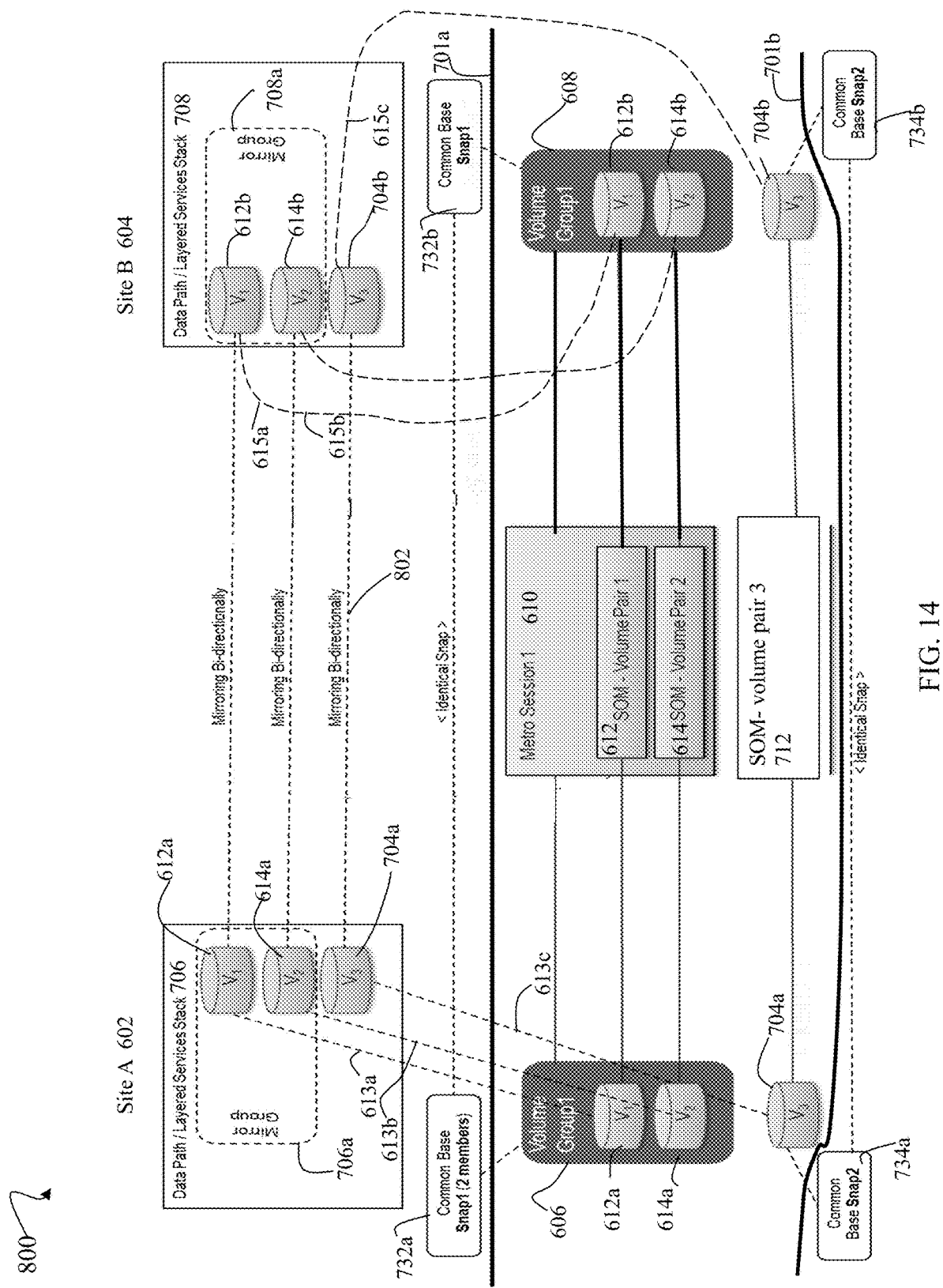

As described in connection with the step S2 and 304 of FIG. 8A, the replication session object or metro session object 710 associated with the stretched LUN V3 can be removed or deleted on both sites A and B. Referring to FIG. 14, shown is an example 800 illustrating the state of the components whereby the object 710 associated with the stretched LUN V3 is eliminated. Additionally, other storage resources and components or objects associated with the stretched LUN V3 can be retained. For example, the snaps 734a of local volume 704a of site A, and the snaps 734b of local volume 704b of site B are retained. The existing local volume pair 704a-b of sites A and B are retained, along with the contents thereon. The established bi-directional synchronous replication configuration for the stretched LUN V3 continues replicating (802) and the associated remaining components (e.g., SOM 712) of the layered services stack of the data paths 706, 708 are also retained. In this manner, only the top level object, the replication session object (also referred to as the metro session object) 710 is deleted or removed from the components of the stack associated with the stretched LUN V3. Thus FIG. 14 illustrates the state of components after completing the step S2 and 304 of FIG. 8A.

As described in connection with the step S3 and 306 of FIG. 8B, the stretched LUN V3 is added to the group GP1 on the sites A and B. In particular as illustrated in the example 900 of FIG. 15, the step S3 can include adding the stretched LUN V3 as a new member to the volume group GP1 definitions 606 of site A and 608 of site B. In particular, the LUN V3 704a is added to the volume group GP1 606 of site A, and the LUN V3 704b is added to the volume group GP1 608 of site B. The updated volume group definitions for GP1 as denoted by 606 and 608 can be exposed or visible to the user.

Figure 15:
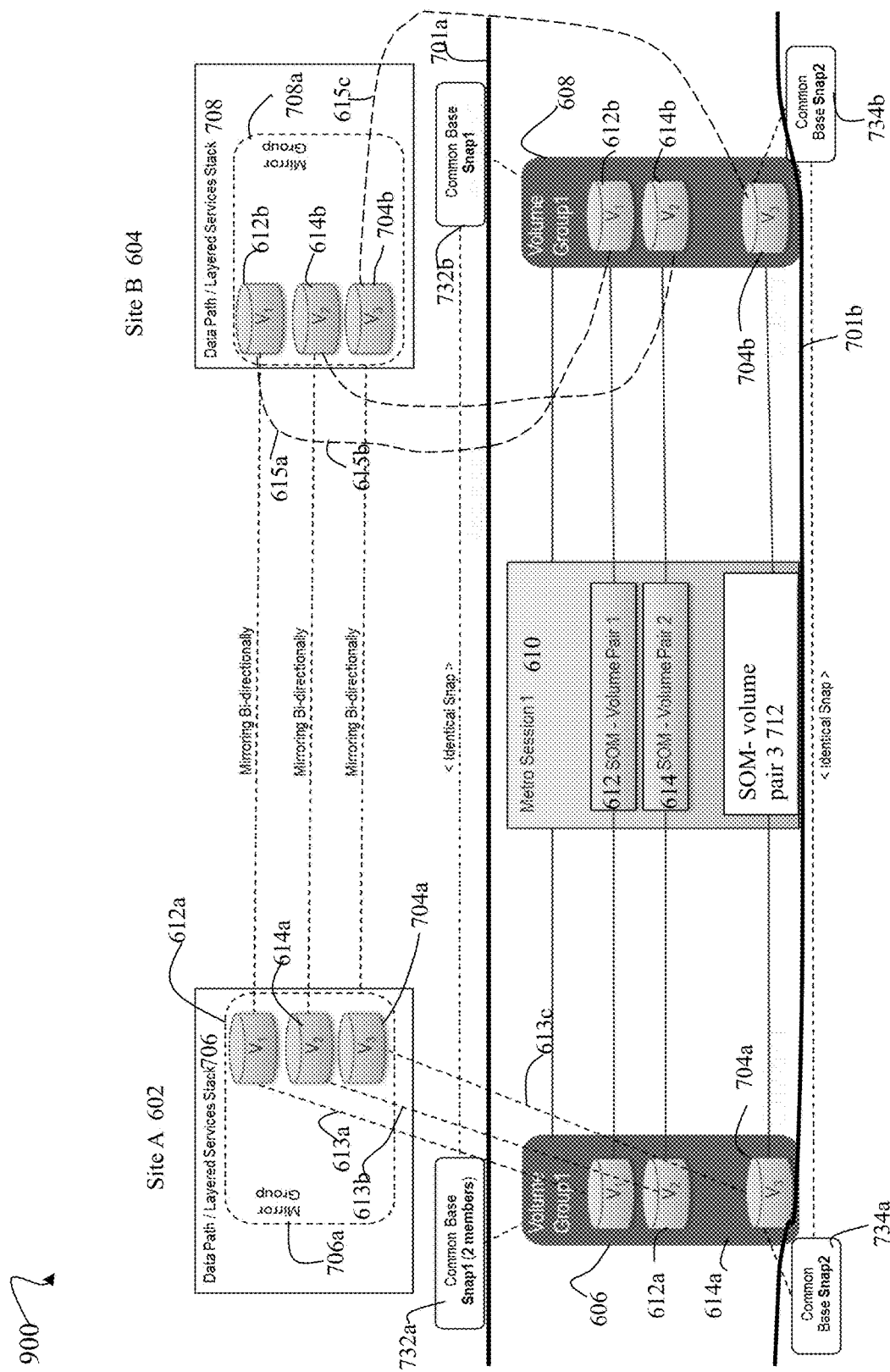

Also in the step S3 and 306 of FIG. 8B and with reference to FIG. 15, the SOM object 712 associated with the stretched LUN V3 is now added to, or associated with, the replication session object or metro session object 710 of the volume group GP1 on both sites A and B. Additionally in the step S3 and 306 of FIG. 8B and with reference to FIG. 15, the stretched LUN V3 is added to the mirror groups of the layered services stacks of the data paths 706, 708. In particular, the local resource V3 704a is added to the mirror group 706a of the layered services stack 706 of the data path of site A; and the local resource V3 704b is added to the mirror group 708a of the layered services stack 708 of the data path of site B.

Thus the example 900 of FIG. 15 can denote the state of the components after completing the step S3 and 306 of FIG. 8B.

Figure 16:
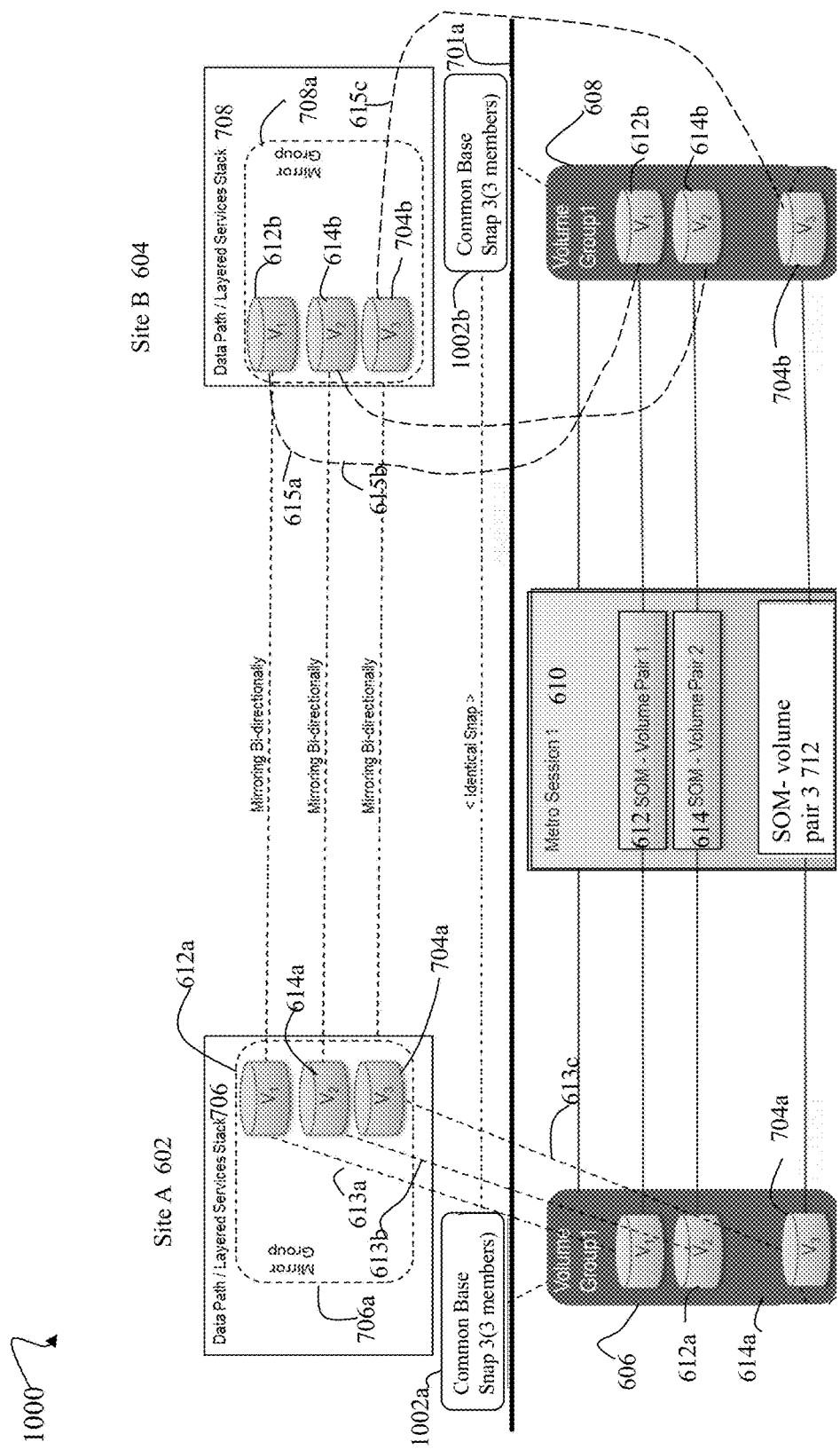
Figure 17:
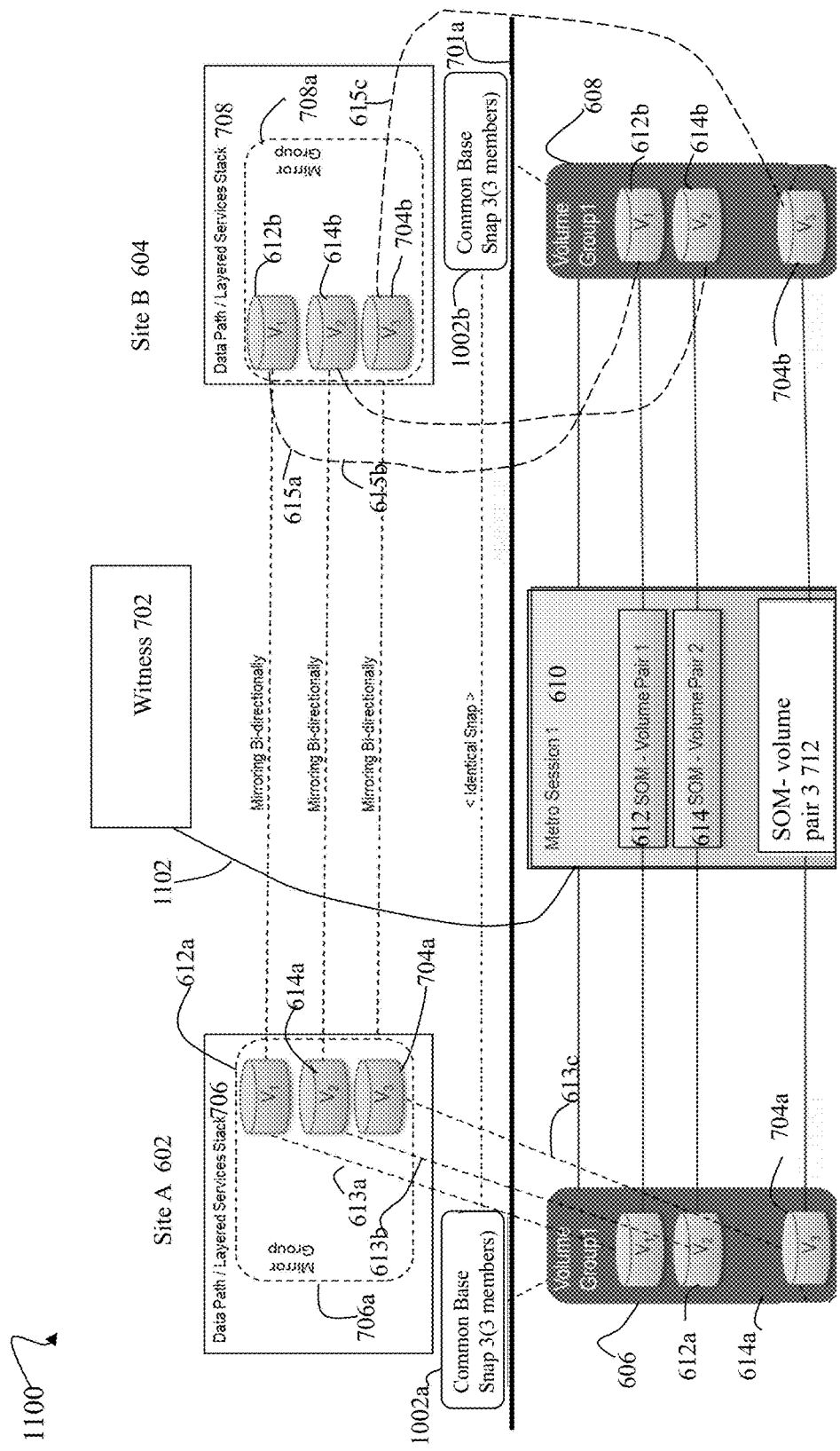

As described in connection with the step S4 and 308 of FIG. 8B, new recovery snapshots can be captured of the updated volume group GP1. Referring to FIG. 16, shown is an example 900 illustrating the system after taking a new recovery snapshot, snap3, of the 3 members of GP1. In particular, the element 1002a illustrates the recovery snapshot snap3 taken of the 3 members of GP1 606 on site A; and 1002b illustrates the recovery snapshot snap3 taken of the 3 members of GP1 608 on site B.

Thus the example 1000 of FIG. 16 can denote the state of the components after completing the step S4 and 308 of FIG. 8A.

As described in connection with the step S5 and 310 of FIG. 8B and with reference to FIG. 16, the witness 702 can be re-engaged 1102. Thus the example 1100 of FIG. 16 can denote the state of the components after completing the step S5 and 310 of FIG. 8B.

Although the additional detail of FIGS. 12-17 is described in connection with the first workflow to add an existing stretched LUN or volume to an existing metro volume group GP1, it should be readily apparent and straightforward to similarly apply and perform the processing step of the second workflow the remove a stretched LUN or volume from GP1 where the removed stretched volume or LUN is retained along with its associated configuration, snapshots, associated stack components along with a newly created replication session object, and the like, as described elsewhere herein. For example, FIG. 16 can denote the state of the components after completing the step S11 and 402 of FIG. 8B. For example, FIG. 13 can denote the state of the components after completing the steps S12, S13 and S14 (e.g., steps 404, 406 and 408 of FIGS. 9A-B) with the difference that the snaps 732a-b and 734a-b are omitted and where alternatively there exists the GP1 group level snapshots denoted by 1002a-b.

The techniques described in the present disclosure can be performed by any suitable hardware and/or software. For example, techniques herein can be performed by executing code which is stored on any one or more different forms of computer-readable media, where the code is executed by one or more processors, for example, such as processors of a computer or other system, an ASIC (application specific integrated circuit), and the like. Computer-readable media includes different forms of volatile (e.g., RAM) and non-volatile (e.g., ROM, flash memory, magnetic or optical disks, or tape) storage, where such storage includes be removable and non-removable storage media.

While the present disclosure provides various embodiments shown and described in detail, their modifications and improvements will become readily apparent to those skilled in the art. It is intended that the specification and examples be considered as exemplary only with the true scope and spirit of the present disclosure indicated by the following claims.

What is claimed is:

1. A computer-implemented method comprising:
  establishing a first synchronous replication configuration for a group of one or more existing stretched resources, wherein each of the existing stretched resources of the group is configured from a first local resource of a first site and a second local resource of a second site, wherein the first local resource of the first site and the second local resource of the second site for said each existing stretched resource are configured to have a same resource identity as presented to a host;
  establishing a second synchronous replication configuration for a first stretched resource, wherein the first stretched resource is configured as an existing stretched resource from a third local resource of the first site and a fourth local resource of the second site, wherein the third local resource of the first site and the fourth local resource of the second site for said first stretched resource are configured to have a same first resource identity as presented to the host; and
  performing first processing that adds the first stretched resource to the group of one or more existing stretched resources, wherein the first stretched resource is configured as an existing stretched resource prior to performing said first processing, wherein said first processing includes:
    while retaining a first remaining portion of a first layered services stack of the first site that corresponds to the first stretched resource, deleting a first replication session object of the first layered services stack of the first site;
    while retaining a second remaining portion of a second layered services stack of the second site that corresponds to the first stretched resource, deleting a second replication session object of the second layered services stack of the second site;
    associating the first remaining portion of the first layered services stack, corresponding to the first stretched resource, with a third replication session object of a third layered services stack of the first site corresponding to the group thereby adding the first remaining portion of the first layered services stack to the third layered services stack corresponding to the group on the first site; and
    associating the second remaining portion of the second layered services stack, corresponding to the first stretched resource, with a fourth replication session object of a fourth layered services stack of the second site corresponding to the group thereby adding the second remaining portion of the second layered services stack to the fourth layered services stack corresponding to the group on the second site.

2. The computer-implemented method of claim 1, wherein, for each of the existing stretched resources of the group configured from the first local resource of a first site and the second local resource of a second site, the first local resource is exposed to the host over a first path between the first site and the host, wherein the second local resource is exposed to the host over a second path between the second site and the host, wherein the host identifies the first path and the second path as two paths to said each existing stretched resource having the same resource identity, wherein each of the existing stretched resources of the group is configured for two-way or bi-directional synchronous replication wherein there is synchronous replication of writes from the first local resource of the first site to the second local resource of the second site for said each existing stretched resource, and synchronous replication of writes from the second local resource of the second site to the first local resource of the first site for said each existing stretched resource.

3. The computer-implemented method of claim 2, wherein the third local resource is exposed to the host over the first path between the first site and the host, wherein the fourth local resource is exposed to the host over the second path between the second site and the host, wherein the host identifies the first path and the second path as two paths to the first stretched resource having the same first resource identity, wherein the first stretched resource is configured for two-way or bi-directional synchronous replication wherein there is synchronous replication of writes from the third local resource of the first site to the fourth local resource of the second site for said first stretched resource, and synchronous replication of writes from the fourth local resource of the second site to the third local resource of the first site for said first stretched resource.

4. The computer-implemented method of claim 3, wherein prior to performing said first processing, the one or more existing stretched resources of the group and the first stretched resource are in an active-active mode wherein the first path is configured as active with respect to the one or more existing stretched resources of the group and the first stretched resource so the host issues I/Os directed to the one or more existing stretched resources of the group over the first path and issues I/Os directed to the first stretched resource over the first path, and wherein the second path is configured as active with respect to the one or more existing stretched resources of the group and the first stretched resources so the host issues I/Os directed to the one or more existing stretched resources of the group over the second path and issues I/Os directed to the first stretched resource over the second path.

5. The computer-implemented method of claim 4, wherein, while deleting the first replication session object of the first layered services stack of the first site and while deleting the second replication session object of the second layered services stack of the second site, the one or more existing stretched resources of the group and the first stretched resource are in the active-active mode and also bi-directionally synchronously replicating writes between the first site and the second site.

6. The computer-implemented method of claim 1, wherein the first processing includes:
configuring the first site and the second site in a bias mode with respect to the first synchronous replication configuration for the group and the second synchronous replication configuration of the first stretched resource, wherein when in the bias mode, a specified one of the first site and the second site currently configured as the preferred site is designated as a single site which services I/Os directed to stretched resources of the group responsive to a failure or fracture of replication with respect to the group or the first stretched resource, and wherein when in the bias mode and responsive to a failure or fracture of replication with respect to the group or the first stretched resource, the non-preferred site is unavailable for servicing I/Os directed to any stretched resource of the group.

7. The computer-implemented method of claim 6, wherein said configuring the first site and the second site in the bias mode further includes:
transitioning the first site and the second site from a witness mode to the bias mode; and wherein subsequent to completing the first processing, the method includes:
transitioning from the bias mode back to the witness mode, and wherein when in the witness mode, a third site or system serves as a witness and is configured for communication with the first site and the second site, and wherein responsive to a failure or fracture of replication with respect to the group or the first stretched resource, the witness is used in deciding which of the first site and the second site continues servicing I/Os directed to stretched resources of the group and the first stretched resource.

8. The computer-implemented method of claim 1, wherein, for each of the existing stretched resources of the group configured from the first local resource of a first site and the second local resource of a second site, the first local resource is exposed to the host over a first path between the first site and the host, wherein each of the existing stretched resources of the group is configured for one-way synchronous replication wherein there is synchronous replication of writes from the first local resource of the first site to the second local resource of the second site for said each existing stretched resource.

9. The computer-implemented method of claim 8, wherein the third local resource is exposed to the host over the first path between the first site and the host, wherein the first stretched resource is configured for one-way synchronous replication wherein there is synchronous replication of writes from the third local resource of the first site to the fourth local resource of the second site for said first stretched resource.

10. The computer-implemented method of claim 1, wherein the first processing includes:
retaining first snapshots taken of the third local resource configured as the first stretched resource on the first site; and
retaining second snapshots taken of the fourth local resource configured as the first stretched resource on the second site.

11. The computer-implemented method of claim 10, wherein the first processing includes:
retaining the second synchronous replication configuration of the first stretched resource.

12. The computer-implemented method of claim 11, wherein the first processing includes:
retaining the first stretched resource, including retaining content of the third local resource and content of the second local resource both configured as the first stretched resource.

13. The computer-implemented method of claim 1, wherein subsequent to completing the first processing, the method includes:
creating a first recovery snapshot of the group on the first site; and
creating a second recovery snapshot of the first group on the second site.

14. The computer-implemented method of claim 1, wherein the first stretched resource and each the one or more existing stretched resources is a first resource type of a plurality of defined resource types, wherein the plurality of defined resource types include one or more of: a volume, a logical device; a file; a file system; a sub-volume portion; a virtual volume used by a virtual machine; a portion of a virtual volume used by a virtual machine; and a portion of a file system.

15. A non-transitory computer-readable medium comprising code stored thereon that, when executed, performs a method comprising:
- establishing a first synchronous replication configuration for a group of one or more existing stretched resources, wherein each of the existing stretched resources of the group is configured from a first local resource of a first site and a second local resource of a second site, wherein the first local resource of the first site and the second local resource of the second site for said each existing stretched resource are configured to have a same resource identity as presented to a host; and
- performing first processing that removes a first stretched resource from the group, wherein said first processing includes:
  - creating a first replication session object for the first stretched resource on the first site;
  - creating a second replication session object for the first stretched resource on the second site;
  - while all members of the group are in an active-active state and synchronously replicate data in accordance with the first synchronous replication configuration, removing the first stretched resource from the group on the first site and the second site while retaining a first current configuration of the first stretched resource, wherein the first current configuration retained includes a first portion of a first layered services stack of the first site, wherein the first portion corresponds to the first stretched resource, and wherein the first layered services stack corresponds to the group on the first site, and wherein the first current configuration retained includes a second portion of a second layered services stack of the second site, wherein the second portion corresponds to the first stretched resource, and wherein the second layered services stack corresponds to the group on the second site;
  - associating the first stretched resource with the first replication session object on the first site, wherein said associating the first stretched resource includes associating the first portion of the first layered services stack with the first replication object corresponding to the first stretched resource on the first site thereby forming a third layered services stack corresponding to the first stretched resource on the first site; and
  - associating the first stretched resource with the second replication session object on the second site, wherein said associating the second stretched resource includes associating the second portion of the second layered services stack with the second replication object corresponding to the first stretched resource on the second site thereby forming a fourth layered services stack corresponding to the first stretched resource on the second site.

16. The non-transitory computer readable medium of claim 15, wherein subsequent to completing the first processing, the method includes:
- taking a first snapshot of the group; and
- taking a second snapshot of the first stretched resource independently of the group.

17. The non-transitory computer readable medium of claim 16, wherein taking the first snapshot of the group includes taking a snapshot of each member of the group on both the first site and the second site.

18. A system comprising:
- one or more processors; and
- one or more memories comprising code stored therein that, when executed, performs a method comprising:
  - establishing a first synchronous replication configuration for a group of one or more existing stretched resources, wherein each of the existing stretched resources of the group is configured from a first local resource of a first site and a second local resource of a second site, wherein the first local resource of the first site and the second local resource of the second site for said each existing stretched resource are configured to have a same resource identity as presented to a host;
  - establishing a second synchronous replication configuration for a first stretched resource, wherein the first stretched resource is configured as an existing stretched resource from a third local resource of the first site and a fourth local resource of the second site, wherein the third local resource of the first site and the fourth local resource of the second site for said first stretched resource are configured to have a same first resource identity as presented to the host; and
  - performing first processing that adds the first stretched resource to the group of one or more existing stretched resources, wherein the first stretched resource is configured as an existing stretched resource prior to performing said first processing, wherein said first processing includes:
    - while retaining a first remaining portion of a first layered services stack of the first site that corresponds to the first stretched resource, deleting a first replication session object of the first layered services stack of the first site;
    - while retaining a second remaining portion of a second layered services stack of the second site that corresponds to the first stretched resource, deleting a second replication session object of the second layered services stack of the second site;
    - associating the first remaining portion of the first layered services stack, corresponding to the first stretched resource, with a third replication session object of a third layered services stack of the first site corresponding to the group thereby adding the first remaining portion of the first layered services stack to the third layered services stack corresponding to the group on the first site; and
    - associating the second remaining portion of the second layered services stack, corresponding to the first stretched resource, with a fourth replication session object of a fourth layered services stack of the second site corresponding to the group thereby adding the second remaining portion of the second layered services stack to the fourth layered services stack corresponding to the group on the second site.

19. The system of claim 18, wherein, for each of the existing stretched resources of the group configured from the first local resource of a first site and the second local resource of a second site, the first local resource is exposed to the host over a first path between the first site and the host, wherein the second local resource is exposed to the host over a second path between the second site and the host, wherein the host identifies the first path and the second path as two paths to said each existing stretched resource having the same resource identity, wherein each of the existing stretched resources of the group is configured for two-way or bi-directional synchronous replication wherein there is synchronous replication of writes from the first local resource of the first site to the second local resource of the second site for said each existing stretched resource, and synchronous replication of writes from the second local resource of the second site to the first local resource of the first site for said each existing stretched resource.

20. The system of claim 19, wherein the third local resource is exposed to the host over the first path between the first site and the host, wherein the fourth local resource is exposed to the host over the second path between the second site and the host, wherein the host identifies the first path and the second path as two paths to the first stretched resource having the same first resource identity, wherein the first stretched resource is configured for two-way or bi-directional synchronous replication wherein there is synchronous replication of writes from the third local resource of the first site to the fourth local resource of the second site for said first stretched resource, and synchronous replication of writes from the fourth local resource of the second site to the third local resource of the first site for said first stretched resource.

* * * * *